(12) United States Patent
Chu et al.

(10) Patent No.: US 12,212,416 B2
(45) Date of Patent: *Jan. 28, 2025

(54) BLOCK ACKNOWLEDGMENT OPERATION

(71) Applicant: Marvell Asia Pte Ltd, Singapore (SG)

(72) Inventors: Liwen Chu, San Ramon, CA (US);
Ken Kinwah Ho, San Jose, CA (US);
Hongyuan Zhang, Fremont, CA (US);
Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,785

(22) Filed: Aug. 24, 2023

(65) Prior Publication Data

US 2024/0014938 A1 Jan. 11, 2024

Related U.S. Application Data

(63) Continuation of application No. 17/101,905, filed on Nov. 23, 2020, now abandoned, which is a
(Continued)

(51) Int. Cl.
*H04L 1/1607* (2023.01)
*H04B 7/26* (2006.01)
(Continued)

(52) U.S. Cl.
CPC ......... *H04L 1/1614* (2013.01); *H04B 7/2612* (2013.01); *H04L 1/1621* (2013.01);
(Continued)

(58) Field of Classification Search
CPC ... H04L 1/1614; H04L 1/1621; H04L 1/1642; H04L 1/1835; H04L 1/1874; H04L 5/0055; H04B 7/2612; H04W 84/12
See application file for complete search history.

(56) References Cited

U.S. PATENT DOCUMENTS 10,848,275 B2 11/2020 Chu et al.
2006/0034274 A1 2/2006 Kakani et al.
(Continued)

OTHER PUBLICATIONS

Cherian et al., "IEEE P801.11—Wireless LANs—CRs for subclause 27.4.4," IEEE Drafts 802.11-16/0024r1, 20 pages (Jan. 9, 2018).
(Continued)

*Primary Examiner* — Derrick W Ferris
*Assistant Examiner* — M Mostazir Rahman

(57) ABSTRACT

A first communication device transmits first bitmap length capability information for the first communication device regarding block acknowledgment procedures, and receives second bitmap length capability information for a second communication device regarding block acknowledgment procedures. The first communication device performs a block acknowledgment procedure, including setting a block acknowledgment transmission window size for the block acknowledgment procedure based on the second bitmap length capability information for the second communication device, and a determination of whether a block acknowledgement frame used in the block acknowledgment procedure is a compressed block acknowledgement (C-BA) frame or a multi-station (multi-STA) block acknowledgement frame.

22 Claims, 12 Drawing Sheets

Related U.S. Application Data continuation of application No. 16/051,084, filed on Jul. 31, 2018, now Pat. No. 10,848,275.

(60) Provisional application No. 62/635,396, filed on Feb. 26, 2018.

(51) Int. Cl.
  *H04L 1/1829* (2023.01)
  *H04L 1/1867* (2023.01)
  *H04L 5/00* (2006.01)
  *H04W 84/12* (2009.01)

(52) U.S. Cl.
  CPC .......... *H04L 1/1642* (2013.01); *H04L 1/1835* (2013.01); *H04L 1/1874* (2013.01); *H04L 5/0055* (2013.01); *H04W 84/12* (2013.01)

(56) References Cited

U.S. PATENT DOCUMENTS

| | | | |
|---|---|---|---|
| 2010/0315999 A1 | 12/2010 | Kakani et al. | |
| 2013/0229996 A1 | 9/2013 | Wang et al. | |
| 2014/0254424 A1 | 9/2014 | Gao et al. | |
| 2015/0063320 A1 | 3/2015 | Merlin et al. | |
| 2015/0131517 A1 | 5/2015 | Chu et al. | |
| 2016/0029373 A1* | 1/2016 | Seok | H04L 1/16 370/338 |
| 2016/0080115 A1* | 3/2016 | Josiam | H04L 5/0055 370/329 |
| 2016/0134406 A1 | 5/2016 | Chu et al. | |
| 2016/0323879 A1 | 11/2016 | Ghosh et al. | |
| 2017/0188390 A1* | 6/2017 | Adachi | H04L 5/0007 |
| 2017/0201343 A1* | 7/2017 | Merlin | H04L 1/1614 |
| 2017/0202026 A1 | 7/2017 | Ahn et al. | |
| 2017/0244531 A1 | 8/2017 | Chu et al. | |
| 2017/0279864 A1 | 9/2017 | Chun et al. | |
| 2017/0280359 A1 | 9/2017 | Dong | |
| 2017/0310446 A1* | 10/2017 | Asterjadhi | H04L 1/1685 |
| 2018/0205441 A1* | 7/2018 | Asterjadhi | H04W 72/044 |
| 2019/0075491 A1* | 3/2019 | Ahn | H04L 5/0037 |
| 2020/0322105 A1* | 10/2020 | Chitrakar | H04L 5/0023 |

OTHER PUBLICATIONS

IEEE P802.11axTM/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11axTM/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11acTM-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHZ," The Institute of Electrical and Electronics Engineers, Inc., pp. 1-425 (Dec. 18, 2013).

IEEE Std 802.11TM 2012 (Revision of IEEE Std 802.Nov. 2007) IEEE Standard for Information technology—Telecommunications and information exchange between systems—Local and metropolitan area networks - Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

International Search Report and Written Opinion in International Patent Application No. PCT/US2018/044630, dated Jan. 15, 2019 (19 pages).

Invitation to Pay Additional Fees and Partial International Search Report in International Patent Application No. PCT/US2018/044630, mailed Nov. 20, 2018 (16 pages).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Trainin, "IEEE P802.11—Wireless LANs—Solomon text to cover SFD 3.7 Block Acknowledgement," IEEE Draft 802.11-16/1625r1, 6 pages (Dec. 21, 2016).

\* cited by examiner

FIG. 4A

| Frame Control 402 | Duration 404 | RA 406 | TA 408 | BSSID 410 | Sequence control 412 | HT Control 414 | Frame Body 416 | FCS 418 |
|---|---|---|---|---|---|---|---|---|
| 2 | 2 | 6 | 6 | 6 | 2 | 4 | Variable | 4 |

Octets:

| Category 422 | BA Action 424 | Dialog Token 426 | BA Parameter Set 428 | BA Timeout Value 430 | BA Starting Sequence control 432 | GCR Group Address Element 434 | Multi-band 436 | ADDBA Extension 438 |
|---|---|---|---|---|---|---|---|---|

| Category 442 | BA Action 444 | Dialog Token 446 | Status Code 448 | BA Parameter Set 450 | BA Timeout Value 452 | GCR Group Address Element 454 | Multi-band 456 | ADDBA Extension 458 |
|---|---|---|---|---|---|---|---|---|

← 440

FIG. 7A  ← 700
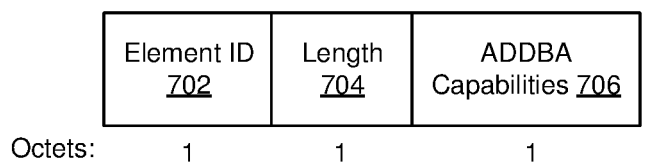
FIG. 7B  ← 720
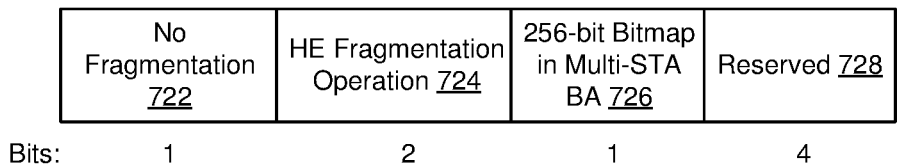
FIG. 7C  ← 740
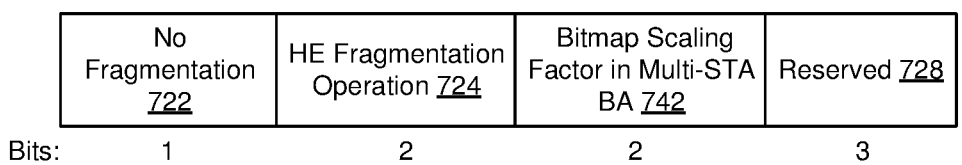

BLOCK ACKNOWLEDGMENT OPERATION

CROSS REFERENCES TO RELATED APPLICATIONS

The present application is a continuation application of U.S. application Ser. No. 17/101,905, filed on Nov. 23, 2020, entitled "Block Acknowledgment Operation." which is a continuation of U.S. patent application Ser. No. 16/051,084 (now U.S. Pat. No. 10,848,275), entitled "Block Acknowledgment Operation," filed on Jul. 31, 2018, which claims the benefit of U.S. Provisional Patent Application No. 62/635,396, entitled "High Efficiency (HE) Block ACK (BA) Operation," filed on Feb. 26, 2018. All of the applications referenced above are hereby incorporated herein by reference in their entireties.

FIELD OF TECHNOLOGY

The present disclosure relates generally to wireless communication systems, and more particularly to acknowledging data transmissions in the wireless communication systems.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method includes: transmitting, by a first communication device, first bitmap length capability information for the first communication device regarding block acknowledgment procedures; receiving, at the first communication device, second bitmap length capability information for a second communication device regarding block acknowledgment procedures; generating, at the first communication device, a first communication frame corresponding to a request to participate in a block acknowledgment procedure, wherein the first communication frame includes a first field indicating a number of buffers requested to be allocated at the second communication device for buffering data units to be transmitted by the first communication device transmitting, by the first communication device, the first communication frame to the second communication device; receiving, at the first communication device, a second communication frame corresponding to a response to the first communication frame, wherein the second communication frame includes a second field indicating a number of buffers allocated at the second communication device for buffering the data units transmitted by the first communication device; and performing, at the first communication device, the block acknowledgment procedure, including setting a block acknowledgment transmission window size for the block acknowledgment procedure based on i) the second bitmap length capability information for the second communication device, ii) a value of the second field that indicates the number of buffers allocated at the second communication device, and iii) a determination of whether a block acknowledgement frame used in the block acknowledgment procedure is a compressed block acknowledgement (C-BA) frame or a multi-station (multi-STA) block acknowledgement frame.

In another embodiment, an apparatus comprises a wireless network interface device associated with a first communication device, wherein the wireless network interface device includes one or more integrated circuit (IC) devices. The one or more IC devices are configured to: transmit first bitmap length capability information for the first communication device regarding block acknowledgment procedures; receive second bitmap length capability information for a second communication device regarding block acknowledgment procedures; generate a first communication frame corresponding to a request to participate in a block acknowledgment procedure, wherein the first communication frame includes a first field indicating a number of buffers requested to be allocated at the second communication device for buffering data units transmitted by the first communication device; transmit the first communication frame to the second communication device; receive a second communication frame corresponding to a response to the first communication frame, wherein the second communication frame includes a second field indicating a number of buffers allocated at the second communication device for buffering the data units transmitted by the first communication device; and perform the block acknowledgment procedure, including setting a block acknowledgment transmission window size for the block acknowledgment procedure based on i) the second bitmap length capability information for the second communication device, ii) a value of the second field, and iii) a determination of whether a block acknowledgement frame used in the block acknowledgment procedure is a C-BA frame or a multi-STA block acknowledgement frame.

In yet another embodiment, a method includes: transmitting, by a first communication device, first bitmap length capability information for the first communication device regarding block acknowledgment procedures; receiving, at the first communication device, second bitmap length capability information for a second communication device regarding block acknowledgment procedures; receiving, at the first communication device, a first communication frame corresponding to a request for participating in the block acknowledgment procedure, wherein the first communication frame includes a first field indicating a number of buffers requested to be allocated at the first communication device for buffering data units transmitted by the second communication device; generating, at the first communication device, a second communication frame corresponding to a response to the first communication frame, wherein the second communication frame includes a second field indicating a number of buffers allocated at the first communication device for buffering the data units transmitted by the second communication device; transmitting, by the first communication device, the second communication frame to the second communication device in response to receiving the first communication frame; and performing, at the first communication device, the block acknowledgment procedure, including selecting a bitmap length for a block acknowledgment frame based on i) the second bitmap length capability information for the second communication device, ii) a value of the second field that indicates the number of buffers allocated at the first communication device, and iii) a determination of whether the block acknowledgement frame is a C-BA frame or a multi-STA block acknowledgement frame.

In still another embodiment, an apparatus comprises: a wireless network interface device associated with a first communication device, wherein the wireless network interface device includes one or more IC devices. The one or more IC devices are configured to: transmit first bitmap length capability information for the first communication device regarding block acknowledgment procedures; receive second bitmap length capability information for a second communication device regarding block acknowledgment procedures; receive a first communication frame corresponding to a request for participating in a block acknowledgment procedure, wherein the first communication frame includes a first field indicating a number of buffers requested to be allocated at the first communication device for buffering data units transmitted by the second communication device; generate a second communication frame corresponding to a response to the first communication frame, wherein the second communication frame includes a second field indicating a number of buffers allocated at the first communication device for buffering the data units transmitted by the second communication device; transmit the second communication frame to the second communication device in response to the first communication frame; and perform the block acknowledgment procedure, including selecting a bitmap length for a block acknowledgment frame based on i) the second bitmap length capability information for the second communication device, ii) a value of the second field, and iii) a determination of whether the block acknowledgement frame is a compressed block acknowledgement (C-BA) frame or a multi-station (multi-STA) block acknowledgement frame.

BRIEF DESCRIPTION OF THE DRAWINGS

FIG. 4A is an example frame format of a BA negotiation frame, according to an embodiment.

FIG. 4B is an example format of a frame body within the BA negotiation frame of FIG. 4A, according to an embodiment.

FIG. 4C is an example format of a frame body within the BA negotiation frame of FIG. 4A, according to another embodiment.

FIG. 7A is an example format of a field within the BA negotiation frame of FIG. 4A, according to an embodiment.

FIG. 7B is an example format of a field within the BA negotiation frame of FIG. 4A, according to an embodiment.

FIG. 7C is an example format of a field within the BA negotiation frame of FIG. 4A, according to an embodiment.

DETAILED DESCRIPTION

Techniques for acknowledging communication frames described below are discussed in the context of wireless local area networks (WLANs) that utilize protocols the same as or similar to protocols defined by the 802.11 Standard from the Institute of Electrical and Electronics Engineers (IEEE) merely for explanatory purposes. For example, embodiments of techniques for acknowledging WLAN communication frames that include i) data being conveyed to another device, and ii) quality of service (QoS) information, regarding the data, in a media access control (MAC) header of the communication frame (sometimes referred to herein as "QoS data frames"), are described below. In other embodiments, however, acknowledgment techniques are utilized for other types of communication frames and/or in other types of wireless communication systems such as personal area networks (PANs), mobile communication networks such as cellular networks, metropolitan area networks (MANs), satellite communication networks, etc., in various embodiments.

Figure 1:
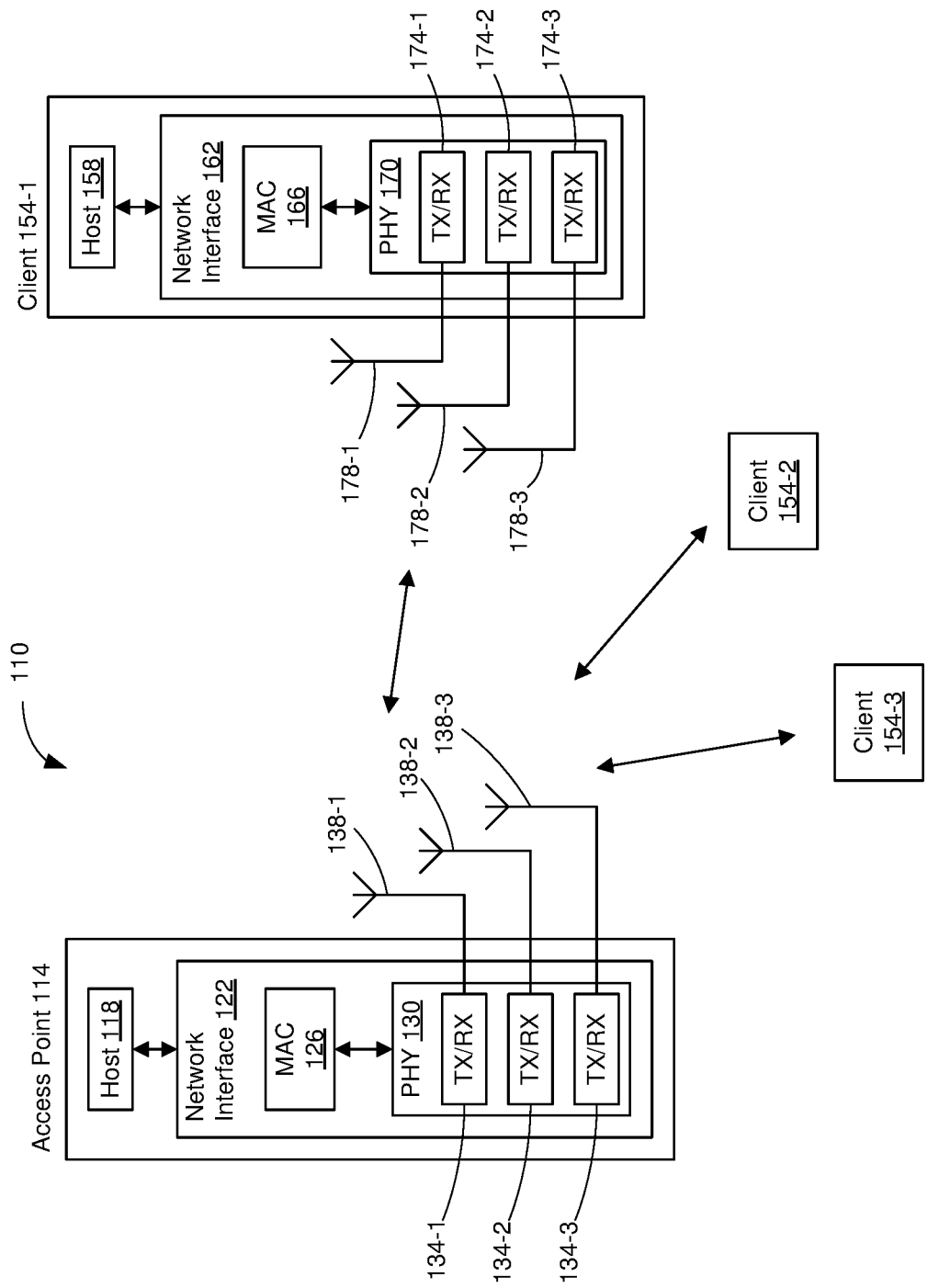
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. Multiple MPDUs may be aggregated to generate aggregated-MPDUs (A-MPDU) for transmission in a PPDU. Multiple MSDUs may be aggregated to generate aggregated-MSDUs (A-MSDUs) for transmission in an MPDU. MPDUs are sometimes referred to herein as frames.

Figure 2:
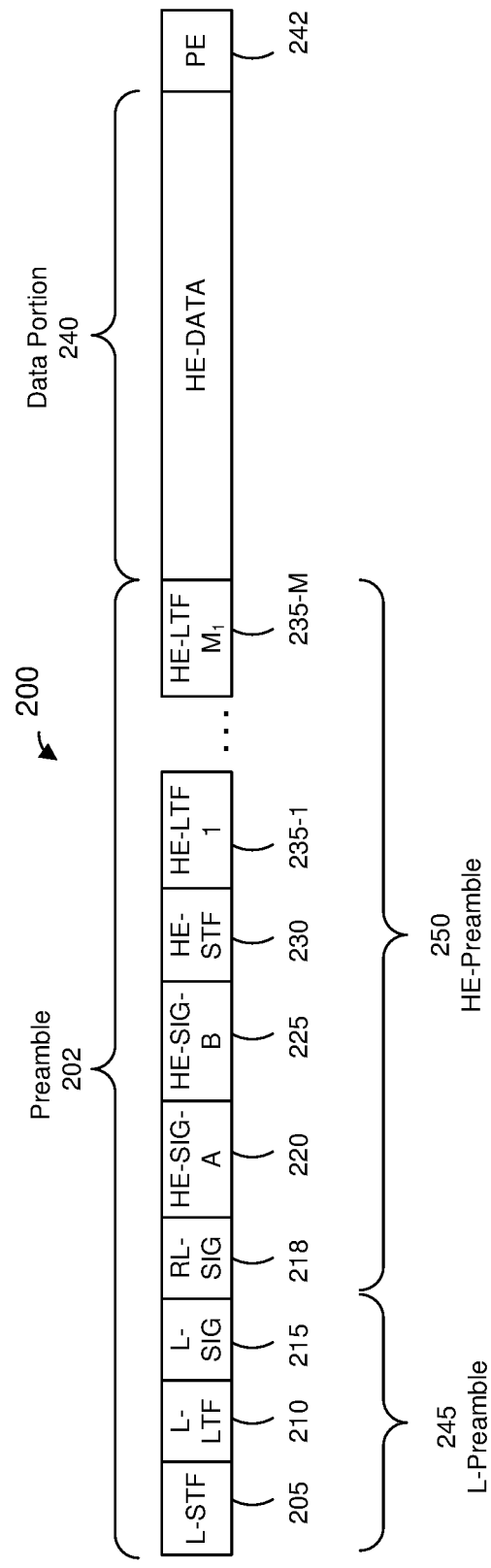
FIG. 2 is a block diagram of an example physical layer (PHY) data unit, according to an embodiment.

FIG. 2 is a diagram of a physical layer (PHY) data unit 200 that the network interface 122 (FIG. 1) is configured to generate and transmit to one or more client stations 154, according to an embodiment. The network interface 162 (FIG. 1) may also be configured to transmit PHY data units the same as or similar to the PHY data unit 200 to the AP 114. The PHY data unit 200 may occupy a 20 MHz bandwidth or another suitable bandwidth. PHY data units similar to the PHY data unit 200 occupy other suitable bandwidths such as 40 MHz, 80 MHz, 160 MHz, 320 MHz, 640 MHz, for example, or other suitable bandwidths, in other embodiments.

The PHY data unit 200 includes a preamble 202 including a legacy short training field (L-STF) 205, a legacy long training field (L-LTF) 210, a legacy signal field (L-SIG) 215, a repeated L-SIG field (RL-SIG) 218, a high efficiency (HE) signal-A field (HE-SIG-A) 220, an HE signal-B field (HE-SIG-B) 225, an HE short training field (HE-STF) 225, and M HE long training fields (HE-LTFs) 230, where M is a suitable positive integer. In an embodiment, M generally corresponds to (e.g., is greater than or equal to) a number of spatial streams via which the PHY data unit 200 will be transmitted. A legacy preamble portion 245 of the preamble 202 includes the L-STF 205, L-LTF 210 and L-SIG 215. An HE preamble portion 250 of the preamble 202 includes the RL-SIG 218, the HE-SIG-A 220, the HE-SIG-B 225, the HE-STF 230 and the M HE-LTFs 235. The PHY data unit 200 also includes a PHY data portion 240 and a packet extension (PE) field 242. The PHY data portion 240 includes one or more MPDUs, MSDUs, an aggregate MPDU (A-MPDU), etc. In some scenarios, the PHY data unit 200 may omit the PHY data portion 240. In some embodiments, the PHY data unit 200 may omit one or more fields corresponding to the preamble 202. In some embodiments, the preamble 202 includes additional fields not illustrated in FIG. 2.

Each of the L-STF 205, the L-LTF 210, the L-SIG 215, the RL-SIG 218, the HE-SIG-A 220, the HE-SIG-B 225, the HE-STF 230, the M HE-LTFs 235, and the data portion 240 comprises one or more orthogonal frequency division multiplexing (OFDM) symbols. As merely an illustrative example, the HE-SIG-A 220 comprises two OFDM symbols.

In the illustration of FIG. 2, the PHY data unit 200 includes one of each of the L-STF 205, the L-LTF 210, the L-SIG 215, the RL-SIG 218 and the HE-SIG-A 220. In some embodiments in which a PHY data unit similar to the PHY data unit 200 occupies a cumulative bandwidth other than 20 MHz, each of the L-STF 205, the L-LTF 210, the L-SIG 215, the RL-SIG 218, and the HE-SIG-A 220 is repeated over a corresponding number of 20 MHz sub-bands of the whole bandwidth of the PHY data unit, in an embodiment. For example, in an embodiment in which the PHY data unit occupies an 80 MHz bandwidth, the PHY data unit 200 includes four of each of the L-STF 205, the L-LTF 210, the L-SIG 215, the RL-SIG 218, and the HE-SIG-A 220.

In an embodiment, the HE-SIG-A 220 generally carries information about the format of the PHY data unit 200, such as information needed to properly decode at least a portion of the PHY data unit 200, in an embodiment. In some embodiments, HE-SIG-A 220 additionally includes information for receivers that are not intended receivers of the PHY data unit 200, such as information needed for medium protection, spatial reuse, etc. In an embodiment where the PHY data unit 200 is a single user (SU) PHY data unit transmitted to/from a single client station, the PHY data unit 200 does not include an HE-SIG-B field 225.

In an embodiment, the PHY data unit 200 is a multi-user (MU) orthogonal frequency division multiple access (OFDMA) data unit in which independent data streams are transmitted to/from multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to transmissions to one or more client stations 154. In an embodiment, the independent data streams in respective allocated RUs are further transmitted using respective spatial streams, allocated to the client stations 154, using multiple-input multiple-output (MIMO) techniques. In an embodiment, the PHY data unit 200 is an MU-MIMO data unit in which independent data streams are transmitted to/from multiple client stations 154 using respective spatial streams, allocated to the client stations 154.

In an embodiment, the HE-SIG-B 225 is present when the PHY data unit 200 is an MU data unit (e.g., OFDMA data unit, MU-MIMO data unit). In an embodiment, the HE-SIGB 224 indicates RU and/or spatial stream allocation configuration for multiple client stations 154.

The PE field 242 is optionally appended to the end of the PHY data unit 200 to provide a receiver device with additional processing time at the end of reception of the PHY data unit 200.

In some embodiments, the data portion 240 includes a communication frame, such as a QoS data frame, an acknowledgment frame, a BA frame, etc. As discussed above, a QoS data frame is a communication frame that includes i) data being conveyed to another device, and ii) QoS information, regarding the data, in a MAC header of the communication frame. In an embodiment, the QoS information includes a traffic identifier (TID) that indicates a traffic category (TC) or traffic stream (TS) to which the frame belongs. In an embodiment, a TC indicates a relative priority of a frame. In an embodiment, a TS is a set of MSDUs to be delivered subject to a particular set of QoS parameter values.

A first communication device that receives one or more QoS data frames (e.g., one or more MPDUs included in one or more PHY data units such as the data unit 200) from a second communication devices may acknowledge the reception of the QoS data frames by transmitting an acknowledgment frame to the second communication device. In an embodiment, the acknowledgment frame may be a block acknowledgment (BA) frame acknowledging the reception of multiple QoS data frames from one or more second communication devices. In an embodiment, the acknowledgment frame may be a multi-station (multi-STA) BA frame acknowledging the reception of multiple QoS data frames transmitted by the second communication device and one or more third communication devices within a MU uplink data unit (e.g., using OFDMA and/or MU-MIMO).

In some embodiments, communication devices negotiate parameters of a BA session prior to participating in the BA session, where a BA frame is employed to acknowledge multiple QoS data frames during the BA session. A communication device that has QoS data frames to transmit and is requesting a BA session is referred to herein as an "originator", and a communication device that is to receive the QoS data frames and is responding to originator's request for the BA session is referred to herein as a "recipient". The recipient will store QoS data frames received during the BA session in buffers prior to transmitting a BA frame. Thus, as an example, the originator requests, as part of the negotiation, a number of buffers for the recipient to use during the BA session based on a number of QoS data frames that the originator has to transmit, according to an embodiment. Similarly, the recipient may not have the requested amount of buffers available, and thus the recipient may specify that the recipient is able to utilize a number of buffers during the BA session that is smaller than the requested number, according to an embodiment.

In an embodiment, the recipient indicates which QoS data frames were successfully received during the BA session with a bitmap. In an embodiment, a communication protocol permits the use of different length bitmaps selected from a set of allowable bitmap lengths. Thus, as another example, the originator requests, as part of the negotiation, a bitmap length for the recipient to use during the BA session based on a number of QoS data frames that the originator has to transmit, according to an embodiment. Similarly, the recipient may not be capable of using the requested bitmap length, and thus the recipient may specify that the recipient is able to utilize a bitmap length that is smaller than the requested length, according to an embodiment.

Figure 3:
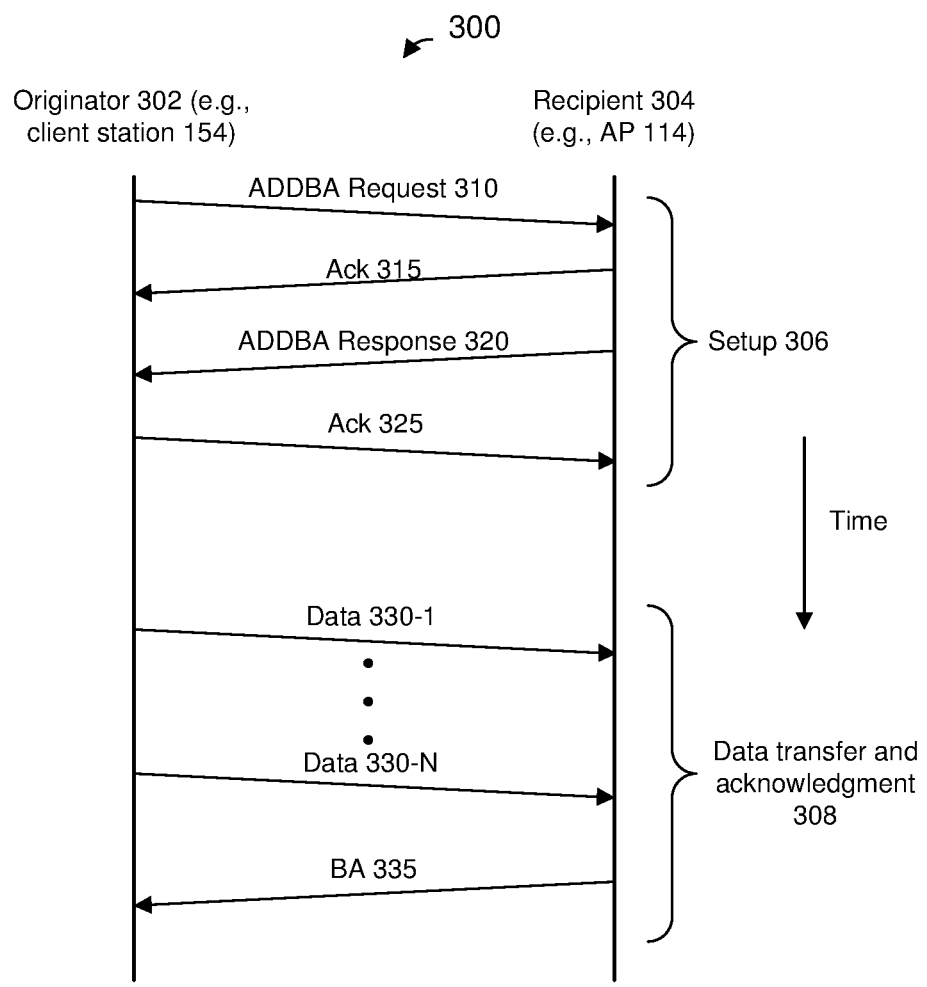
FIG. 3 is a timing diagram of the example frame exchange corresponding to a block acknowledgment (BA) procedure between different communication devices, according to an embodiment.

FIG. 3 is a timing diagram of an example frame exchange 300 corresponding to a BA session between different communication devices. Originator 302 and recipient 304 correspond to respective communication devices in a WLAN (e.g., the AP 114 or the client station 154 in the WLAN 110). As an example, the originator 302 corresponds to the client station 154-1 and the recipient 304 corresponds to the AP 114. As another example, the originator 302 corresponds to the AP 114 or the client station 154-1, and the recipient 304 corresponds to the client station 154-2. In other embodiments, the originator 302 and/or the recipient 304 are other suitable communication devices.

The frame exchange 300 includes at least a setup portion 306 and a data transfer and acknowledgment portion 308. The setup portion 306 corresponds to a negotiation of a BA agreement between the originator 302 and the recipient 304. The data transfer and acknowledgment portion 308 corresponds to transmission of QoS data frames from the originator 302 and transmission of a BA from the recipient 304 in accordance with the negotiated BA agreement. The frame exchange may include a plurality of data transfer and acknowledgment portions 308.

The originator generates and transmits an add block acknowledgment (ADDBA) request frame 310 to the recipient to initiate a BA session between the originator 302 and the recipient 304. The ADDBA request frame 310 corresponds to a request, by the originator 302, to participate in a BA procedure with the recipient, and includes information that is used to negotiate the BA agreement between the originator 302 and the recipient 304. For instance, in an embodiment, the ADDBA request frame 310 includes an indication of a number of buffers requested to be allocated at the recipient 304 to buffer QoS data frames to be transmitted by the originator 302 during the data transfer and acknowledgment portion 308. In an embodiment, the number of buffers requested is determined based on a number of QoS data frames that the originator 302 is to transmit during the data transfer and acknowledgment portion 308.

In response to reception of the ADDBA request frame 310, the recipient generates and transmits an acknowledgment frame 315 to the originator 302 acknowledging the reception of the ADDBA request frame 310.

The AP 114 generates and transmits an ADDBA response frame 320 responding to the ADDBA request frame 310. The ADDBA response frame 320 can either accept or reject the request to participate in the BA session with the originator 302, according to an embodiment. If the ADDBA response frame 320 accepts the request to participate in the BA session, the ADDBA response frame 320 includes information for negotiating the BA agreement with the originator 302. For instance, in an embodiment, the ADDBA response frame 320 includes an indication of a number of buffers allocated at the recipient 304 for buffering QoS data frames transmitted by the originator 302 during the data transfer and acknowledgment portion 308.

In an embodiment, the allocated number of buffers indicated in the ADDBA response frame 320 may be different than the number of buffers indicated in the ADDBA request frame 310. In one such embodiment, to account for the difference, the originator 302 may adjust a number of QoS data frames the originator 302 will transmit prior to expecting a BA from the recipient 304. In an embodiment, the number of QoS data frames to be transmitted prior to expecting a BA from the recipient 304 is referred to as a "transmission window size".

In response to the reception of the ADDBA response frame 320, the originator 302 generates and transmits an acknowledgment frame 325 to the AP 114 acknowledging the reception of the ADDBA response frame 320.

Data transmission from the originator 302 to the recipient 304 occurs during the data transfer and acknowledgment portion 308. The originator 302 transmits multiple QoS data frames 330 (e.g., QoS data frames 330-1, 330-2 ... 330-N) to the recipient 304. In an embodiment, the number of QoS data frames 330 transmitted by the originator 302 prior to receiving a BA corresponds to the allocated number of buffers at the recipient 304. In an embodiment, the one or more QoS data frames 330 are transmitted by the client station 154 as an SU transmission from the client station 154 to the AP 114. In another embodiment, the one or more QoS data frames 330 are transmitted by the client station 154 as part of an uplink (UL) MU transmission including one or more other data frames (not shown) from one or more of the other client stations 154. In an embodiment, the MU transmission is transmitted by the client stations 154 in response to a trigger frame (not shown) transmitted by the AP 114. In an embodiment, the one or more QoS data frames 330 are transmitted by the AP 114 as an SU transmission to the client station 154. In an embodiment, the one or more QoS data frames 330 are transmitted by the AP 114 to the client station 154 within a downlink MU transmission.

In an embodiment, the QoS data frames 330 correspond to multiple MPDUs. In various embodiments, the multiple MPDUs 330 are transmitted in multiple PPDUs or within a single PPDU (e.g., within an A-MPDU in the single PPDU).

Following the reception of the one or more QoS data frames 330, the recipient 304 transmits a BA frame 335 to the originator 302 to acknowledge the reception of at least some of the QoS data frames 330. The BA frame 335 indicates whether each of the QoS data frames 330 was successfully received at the recipient. In an embodiment in which the QoS data frames 330 are transmitted by the client station 154 as part of an uplink MU transmission including one or more other data frames from one or more of the other client station 154, the BA frame 335 is a multi-STA BA frame acknowledging the reception of the one or more QoS data frames 330 and the one or more other QoS data frames. In an embodiment where the one or more QoS data frames 330 are transmitted by the client station 154 as part of an SU transmission, the BA frame 335 is a compressed block acknowledgment (C-BA) frame indicating whether the one or more QoS data frames 330 were successfully received at the AP 114. In an embodiment, the BA frame 335 is transmitted in response to a block acknowledgment request (BAR) frame (not shown) transmitted by the client station 154.

FIG. 4A is a diagram of an example format of a frame 400 used for negotiating a BA agreement between two communication devices, according to an embodiment. In an embodiment, the frame 400 corresponds to an MPDU as generated by a MAC processor of a communication device. Referring now to FIG. 3, the ADDBA request frame 310 and/or the ADDBA response frame 320 have the format 400, according to some embodiments. In an embodiment, the frame 400 is generated by the MAC processor 126 of the network interface 122. In another embodiment, the frame 400 is generated by the MAC processor 166 of the network interface 162. FIG. 4A indicates example lengths (e.g., in terms of octets) of fields of the frame 400. In other embodiments, length(s) one or more of the fields has another suitable number length(s). In some embodiments, one or more of the fields are omitted and/or one or more additional fields are included in the frame 400.

The frame 400 includes a frame control field 402, a duration field 404, a receiver address (RA) field 406, a transmitter address (TA) field 408, a basic service set identifier (BSSID) field 410, a sequence control field 412, a high throughput (HT) control field 414, a frame body 416, and a frame check sequence (FCS) field 418.

The frame control field 402 includes information that identifies a type of the frame 400 and/or a function corresponding to the frame 400. For instance, in an embodiment corresponding to the IEEE 802.11 Standard, the frame control field includes information that indicates that the frame 400 is a management frame. The duration field 404 includes information that indicates a length of a transmit opportunity period (TXOP) during which a particular communication frame exchange will take place, in an embodiment. For instance, in an embodiment wherein the frame 400 includes an ADDBA request frame 310, the duration field 404 includes an indication of an estimated time required for the transmission of the acknowledgment frame 315 (including any interframe space between the ADDBA request frame 310 and the acknowledgment frame 315). The RA field 406 includes an address corresponding to a target recipient (e.g., the recipient 304) of the frame 400. The TA field 408 includes an address corresponding to a transmitter (e.g., the originator 304) of the frame 400. The BSSID field 410 includes an identifier of a BSS corresponding to the frame 400. The sequence control field 412 includes an identifier assigned to information included in the frame body. For example, in an embodiment, the sequence control field includes a sequence number that is assigned to an MSDU or an A-MSDU included in the frame body 416. The HT control field 414, if present, may include different types of control information corresponding to the frame 400. The frame body 416 includes one or more frames. For instance, in an embodiment, the frame body 416 includes the ADDBA request frame 310 or the ADDBA response frame 320 as discussed above with reference to FIG. 3. The FCS field 416 includes an error detecting code that enables a receiving device to determine whether the frame 400 was received without any errors.

FIG. 4B is a diagram of an example format of a frame body portion 420 of an ADDBA request frame. In an embodiment, the frame body portion 420 is included in the frame body 416 (FIG. 4A). In an embodiment, the frame body portion 420 is generated by the MAC processor 126 of the network interface 122. In another embodiment, the frame body portion 420 is generated by the MAC processor 166 of the network interface 162. In some embodiments, one or more of the fields are omitted and/or one or more additional fields are included in the frame body portion 420.

The frame body portion 420 includes a category field 402, a BA action field 424, a dialog token field 426, a BA parameter set field 428, a BA timeout value field 430, a BA starting sequence control field 432, a groupcast with retries (GCR) group address element 434, a multi-band field 436, and an ADDBA extension element 438.

The category field 422 includes information that identifies the frame 400 as a frame corresponding to a BA session. The BA action field 424 includes information that specifically identifies the frame 400 as an ADDBA request frame. For example, a value of 0 in the BA action field 424 as the frame 400 as an ADDBA request frame. The dialog token field 426 includes a non-zero value as set by a communication device transmitting the ADDBA request frame and is used to match a response frame (e.g., the ADDBA response frame 320 as illustrated in FIG. 3) to the ADDBA request frame. The BA parameter set field 428 is used to signal parameters for setting up the BA agreement. The BA timeout value field 430 includes information indicating a duration after which a BA setup is terminated if no frame exchanges occur. The BA starting sequence control field 432 includes information indicating an identifier of a first communication frame to be transmitted under the BA agreement. For instance, in an embodiment, the sequence number corresponding to a first communication frame to be transmitted (e.g., a first MSDU of the data frame 330-1 as described above with reference to FIG. 3) under the BA agreement. The GCR group address element 434 indicates a group address of communication devices for which the BA agreement is being requested. The multi-band field 436 includes information indicating a frequency band for which the BA agreement is being negotiated and for which the ADDBA request frame applies. The ADDBA extension element 438 may include other information, such as information regarding whether MSDU fragmentation is allowable under the BA agreement.

FIG. 4C is a diagram of an example format of a frame body portion 420 of an ADDBA response frame. In an embodiment, the frame body portion 420 is included in the frame body 416 (FIG. 4A). In an embodiment, the frame body portion 440 is generated by the MAC processor 126 of the network interface 122. In another embodiment, the frame body portion 440 is generated by the MAC processor 166 of the network interface 162. In some embodiments, one or more of the fields are omitted and/or one or more additional fields are included in the frame body portion 440.

The frame body portion 440 includes a category field 442, a BA action field 444, a dialog token field 446, a status code field 448, a BA parameter set field 450, a BA timeout value field 452, a GCR group address element 454, a multi-band element 456, and an ADDBA extension element 458.

The category field 442 includes information that identifies the frame 400 as a frame corresponding to the BA mechanism. The BA action field 444 includes information that specifically identifies the frame 400 as an ADDBA response frame. For example, a value of 1 in the BA action field 424 identifies the frame 400 as an ADDBA response frame. The dialog token field 446 includes a value copied from the dialog token field of a corresponding ADDBA request frame (e.g., the dialog toke field 426 of the ADDBA request frame) and is used to match the ADDBA response frame to the corresponding ADDBA request frame. The status code field 448 indicates whether the corresponding ADDBA request frame was successful in negotiating the BA agreement. The BA parameter set field 450 is used to signal parameters for setting up the BA agreement. The BA timeout value field 452 includes information indicating a duration after which the BA setup is terminated if no frame exchanges occur. The GCR group address element 454 indicates the group address of the communication devices for which the BA agreement is being requested. The multi-band element 456 includes information indicating a frequency band for which the BA agreement is being negotiated and for which the ADDBA response frame applies. The ADDBA extension element 458 may include other information, such as information regarding whether MSDU fragmentation is allowable under the BA agreement.

Figure 4D:
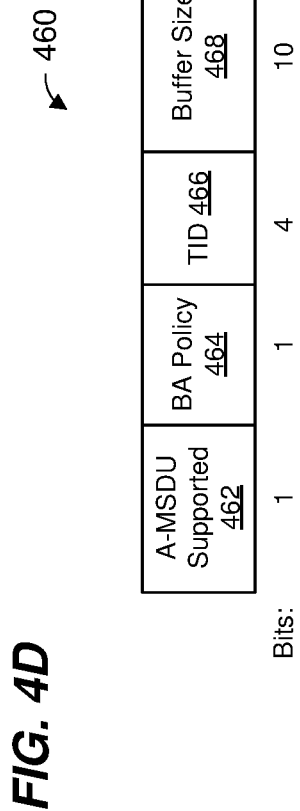
FIG. 4D is an example format of a field within the BA negotiation frame of FIG. 4A, according to an embodiment.

FIG. 4D is a diagram of an example format of the BA parameter set field 460, in an embodiment, as included in the ADDBA request frame 310 and the ADDBA response frame 320. In an embodiment, the BA parameter set field 460 corresponds to the BA parameter set field 428 (FIG. 4B) and/or to the BA parameter set field 450 (FIG. 4C). FIG. 4D indicates example lengths (e.g., in terms of bits) of subfields of the BA parameter set field 460. In other embodiments, length(s) one or more of the subfields has another suitable number length(s). In some embodiments, one or more of the subfields are omitted and/or one or more additional subfields are included in the BA parameter set field 460.

The BA parameter set field 460 includes an A-MSDU supported subfield 462, a BA policy subfield 464, a TID subfield 466, and a buffer size subfield 468.

The A-MSDU subfield 462 includes a value that indicates whether a communication device (e.g., the AP 114 or the client station 154) supports the transmission and reception of A-MSDUs (e.g., among the QoS data frames 330) under the BA agreement. The BA policy subfield 464 includes a value that indicates an ACK policy (e.g., immediate BA, delayed BA, etc.) corresponding to the QoS data frames 330. The TID subfield 466 includes a value that identifies the traffic category (TC) or traffic stream (TS) corresponding to the negotiated BA agreement regarding the QoS data frames 330. When the BA parameter set field 460 corresponds to the ADDBA request frame 310, the buffer size subfield 468 includes a value that indicates the number of buffers requested to be allocated at the recipient 304 to buffer the QoS data frames 330, corresponding to the TC/TS identified in the TID subfield 466, transmitted by the originator 302 during the data transfer and acknowledgment portion 308. The Buffer Size field 468 in the ADDBA request frame 310 also specifies a requested BA bitmap length in a C-BA frame. When a value of the Buffer Size field 468 is no more than 64, the requested BA bitmap length in the C-BA frame is 64; and when the value of the Buffer Size field 468 is more than 64 but less than 256, the requested BA bitmap length in the C-BA frame is 256, according to an embodiment. When the BA parameter set field 460 corresponds to the ADDBA response frame 320, the buffer size subfield 468 includes a value that indicates the number of buffers that the recipient 304 has allocated to buffer the QoS data frames 330, corresponding to the TC/TS identified in the TID subfield 466, to be transmitted by the originator 302 during the data transfer and acknowledgment portion 308. The Buffer Size field 468 in the ADDBA response frame 320 also specifies an allowed BA bitmap length in the C-BA frame. When a value of the Buffer Size field 468 is no more than 64, the allowed BA bitmap length in C-BA is 256; and when the value of the Buffer Size field 468 is more than 64 but less than 256, the allowed BA bitmap length in the C-BA frame is 256, according to an embodiment. In prior art systems, the number of data frames 330 in an A-MPDU soliciting a multi-station BA that may be transmitted in the data transfer and acknowledgment portion 308, corresponding to the TC or TS as indicated in the TID subfield 466, may be less than the number of buffers allocated at the recipient for an A-MPDU that solicits a C-BA. Accordingly, the allowed BA bitmap in multi-station BA may be less than the allowed BA bitmap in C-BA.

Figure 5:
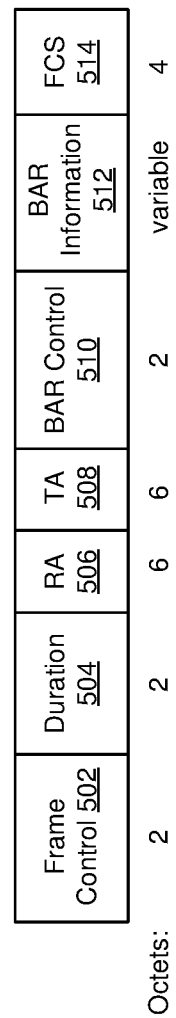
FIG. 5 is an example format of block acknowledgment request (BAR) frame, according to an embodiment.

FIG. 5 is a diagram of an example format of a BAR frame 500 used for requesting a BA frame from one or more communication devices, according to an embodiment. Referring now to FIG. 3, the BAR frame 500 may be transmitted by the originator 302 to solicit the BA frame 335 from the recipient. In an embodiment, the BAR frame 500 is generated by the MAC processor 126 of the network interface 122. In an embodiment, the BAR frame 500 is generated by the MAC processor 166 of the network interface 162. FIG. 5 indicates example lengths (e.g., in terms of octets) of fields of the BAR frame 500. In other embodiments, length(s) one or more of the fields has another suitable number length(s). In some embodiments, one or more of the fields are omitted and/or one or more additional fields are included in the BAR frame 500.

The BAR frame 500 includes a frame control field 502, a duration field 504, an RA field 506, a TA field 508, a BAR control field 412, a BAR information field 512, and a frame check sequence (FCS) field 514.

The frame control field 502 includes information that identifies frame 500 as a BAR frame. For instance, in an embodiment corresponding to the IEEE 802.11 Standard, the frame control field 502 includes information that indicates that the frame 500 is a control frame corresponding to a BAR. The duration field 504 includes information that indicates a length of a TXOP during which a particular frame exchange will take place, in an embodiment. For instance, in an embodiment, the duration field 504 includes an indication of an estimated time required for the transmission of the BAR frame 500 and the BA frame (e.g., the BA frame 335) that is solicited by the BAR frame 500 (including any interframe space between the BAR frame 500 and the BA frame). The RA field 506 includes an address corresponding to a target recipient (e.g., the recipient 304) of the frame 500. The TA field 508 includes an address corresponding to a transmitter (e.g., the originator 302) of the frame 500. The BAR control field 510 includes information that identifies a type of the BAR frame 500. For instance, the BAR control field 510 identifies the BAR frame 500 as corresponding to a compressed-BAR (C-BAR) frame, or a multi-traffic identifier (multi-TID) BAR frame, etc. The BAR information field 512 indicates identification of data frames for which the BA is being solicited. For instance, in an embodiment, the BAR information field 512 indicates a sequence number corresponding to a first communication frame among the QoS data frames for which the BA is being solicited. The FCS field 514 includes an error detecting code that enables a receiving device to determine whether the frame 500 was received without any errors.

In an embodiment in which the BAR frame 500 corresponds to a multi-TID BAR frame, the BAR information field 512 further indicates TIDs corresponding to the QoS data frames 330 for which the BA is being solicited. In an embodiment in which the BAR frame 500 corresponds to a multi-TID BAR frame, the BAR frame 500 indicates TIDs corresponding to access categories (ACs) which have the same or higher priorities as compared to a current primary AC. In some embodiments, the BAR frame 500 indicates TIDs corresponding to all ACs irrespective of their priorities with respect to the current primary AC.

Figure 6A:
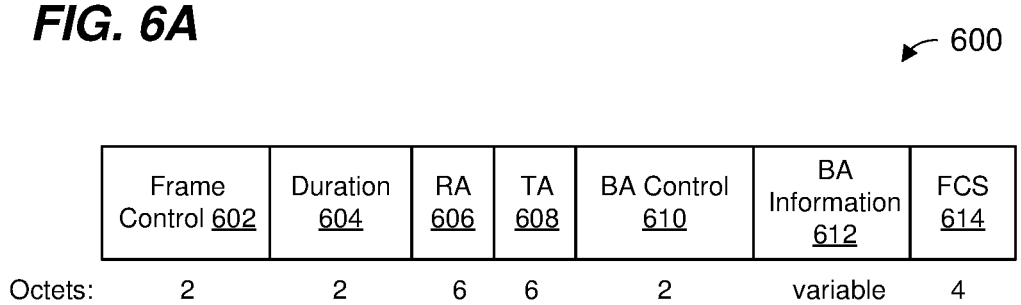
FIG. 6A is an example format of a BA frame, according to an embodiment.

FIG. 6A is a diagram of an example format of a BA frame 600, according to an embodiment. Referring now to FIG. 3, the BA frame 600 may be transmitted by the recipient 304 to acknowledge transmissions (e.g., the one or more QoS data frames 330 (FIG. 3), etc.) from the originator 302. For instance, in an embodiment, the BA frame 600 corresponds to the BA frame 335 of FIG. 3. In an embodiment, the BA frame 600 is generated by the MAC processor 126 of the network interface 122. In an embodiment, the BA frame 600 is generated by the MAC processor 166 of the network interface 162. FIG. 6A indicates example lengths (e.g., in terms of octets) of fields of the BA frame 600. In other embodiments, length(s) one or more of the fields has another suitable number length(s). In some embodiments, one or more of the fields are omitted and/or one or more additional fields are included in the BA frame 600.

In an embodiment, the BA frame 600 is transmitted in response to a BAR frame (such as the BAR frame 500). In another embodiment in which a BAR frame is not transmitted, the BA frame 600 is transmitted in response to reception of the data frames 330 with respective acknowledgment policy indicators (e.g., in a header portion) that indicate that an immediate acknowledgement or a BA frame is to be transmitted in response to the reception of the data frames.

The BA frame 600 includes a frame control field 602, a duration field 604, an RA field 606, a TA field 608, a BA control field 612, a BA information field 612, and a frame check sequence (FCS) field 614.

The frame control field 602 includes information that identifies the frame 600 as a BA frame. For instance, in an embodiment corresponding to the IEEE 802.11 Standard, the frame control field 602 includes information that indicates that the frame 600 is a control frame corresponding to a BA frame. The duration field 604 includes information that indicates a length of a transmit opportunity period (TXOP) during which a particular frame transmission will take place, in an embodiment. For instance, in an embodiment, the duration field 604 includes an indication of an estimated time required for the transmission of the BA frame 600. The RA field 606 includes an address corresponding to a target recipient (e.g., the originator 302) of the frame 600. The TA field 608 includes an address corresponding to a transmitter (e.g., the recipient 304) of the frame 600. The BA control field 610 includes information that identifies a BA variant corresponding to BA frame 600. For instance, the BA control field 610 identifies the BA frame 600 as corresponding to a C-BA frame, a multi-TID BA frame, a multi-STA BA frame, etc. The BA information field 612 indicates identification of the QoS data frames 330 for which the BA is being transmitted and further indicates one or more acknowledgment bitmaps corresponding to acknowledgments of the QoS data frames 330. The FCS field 614 includes an error detecting code that enables a receiving device to determine whether the frame 600 was received without any errors.

Figure 6B:
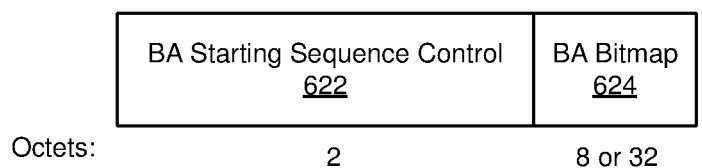
FIG. 6B is an example format of a field within the BA frame of FIG. 6A, according to an embodiment.

FIG. 6B is a diagram of an example format of a BA information field 620, in an embodiment. In an embodiment, the BA information field 620 corresponds to the BA information field 612 (FIG. 6A). FIG. 6B indicates example lengths (e.g., in terms of octets) of fields of the BA information field 620. In other embodiments, length(s) one or more of the fields has another suitable number length(s). In some embodiments, one or more of the fields are omitted and/or one or more additional fields are included in the BA information field 620.

The BA information field 620 includes a BA starting sequence control field 622 and a BA bitmap field 624. In an embodiment, the BA information field 620 corresponds to a C-BA frame indicating whether a plurality of the QoS data frames 330 were successfully received at the recipient 304.

The BA starting sequence control field 622 indicates identification of the QoS data frames 330 being acknowledged in the BA bitmap field 624. For instance, BA starting sequence control field 622 indicates a sequence number corresponding to the first QoS data frame 330-1 (e.g., a sequence number corresponding to an MSDU of the first QoS data frame 330-1) among the QoS data frames being acknowledged in the BA bitmap field 624. The BA bitmap field 624 includes an acknowledgment bitmap that indicates whether the QoS data frames 330 were successfully received at the recipient 304. In an embodiment, each bit of the acknowledgement bitmap indicates whether a corresponding QoS data frame 330, or a fragment of the QoS data frame 330, was successfully received at the recipient 304, starting with the first QoS data frame 330-1 as indicated by the sequence number. For instance, each bit that is equal to 1 in an acknowledgment bitmap acknowledges the successful reception of a single QoS data frame 330 or a fragment thereof.

Figure 6C:
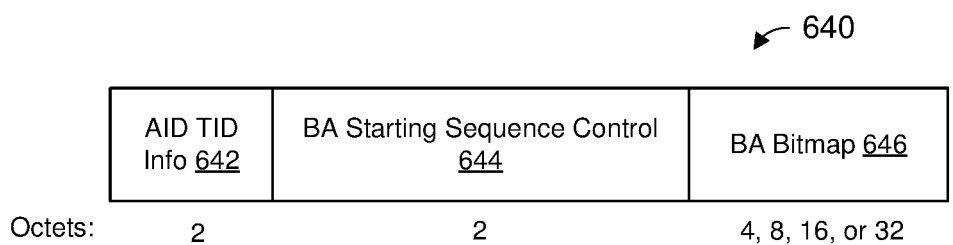
FIG. 6C is an example format of a field within the BA frame of FIG. 6A according to another embodiment.

FIG. 6C is a diagram of an example format of a BA information field 640 in an embodiment. In an embodiment, the BA information field 640 corresponds to the BA information field 612 (FIG. 6A). FIG. 6C indicates example lengths (e.g., in terms of octets) of fields of the BA information field 640. In other embodiments, length(s) one or more of the fields has another suitable number length(s). In some embodiments, one or more of the fields are omitted and/or one or more additional fields are included in the BA information field 640.

The BA information field 640 includes an association identifier (AID) TID information field 642, a BA starting sequence control field 644 and a BA bitmap field 646. In an embodiment, the BA information field 640 corresponds to a multi-STA BA frame indicating whether a plurality of the data frames 330 were successfully received at the recipient 304.

The AID TID information field 642 includes the AID of the originator 302 and the TID of the QoS data frames 330 from the originator 302 being acknowledged in the BA bitmap field 646. Contents of the BA sequence control field 644 and the BA bitmap field 646 are similar to contents of the BA sequence control field 622 and the BA bitmap field 624, respectively, and are not discussed in detail for reasons of brevity. In an embodiment, the BA information field 640 is repeated, with each repetition including a corresponding BA bitmap field 646 acknowledging the reception of a set of QoS data frames corresponding to an AID, TID tuple.

In an embodiment, a communication protocol defines a set of different acknowledgment bitmap lengths that can be used during BA sessions (e.g., included in a BA bitmap field such as the BA bitmap field 624). In various embodiments, a length of the acknowledgment bitmap that is to be included in the BA bitmap field (e.g., the BA bitmap field 624, BA bitmap field 646, etc.) is dependent on the number of buffers allocated at the recipient, as negotiated using ADDBA request and ADDBA response frames (e.g., the ADDBA request frame 310, the ADDBA response frame 320). For instance, an allocated number buffers falling within a particular range corresponds to a particular acknowledgment bitmap length or a subset of acknowledgment bitmap lengths, according to an embodiment.

As an illustrative example, a set of allowable bitmap lengths that can be negotiated (e.g., as defined by the communication protocol) is 64 bits, or 256 bits. If the allocated number of buffers is negotiated to be less than or equal to 64, the negotiated BA bitmap is 64 bit long and the BA bitmap field 646 (corresponding to the multi-STA BA frame) is permitted to have a length of 32 bits or 64 bits. As another example, if the allocated number of buffers is negotiated to be greater than 64, the negotiated BA bitmap is 256 bits long and the BA bitmap field 646 is permitted to be 32 bits long, 64 bits long, 128 bits long, or 256 bits long.

According to some embodiments, the communication protocol defines different sets of supported acknowledgment bitmap lengths for different variants of the BA frame (e.g., C-BA frame, multi-STA BA frame, etc.). In one embodiment of a communication protocol, the requested BA bitmap per the buffer number in an ADDBA Request and the allowed BA bitmap per the buffer number in an ADDBA Response is the bitmap length for a C-BA frame, whereas the bitmap length for a multi-STA BA is 64. In another embodiment of a communication protocol, the requested BA bitmap per the buffer number in an ADDBA Request and the allowed BA bitmap per the buffer number in an ADDBA Response is the bitmap length of a C-BA and the bitmap length of multi-STA BA.

In an embodiment, the set of supported acknowledgment bitmap lengths in the BA bitmap field 646 limits the number of QoS data frames 330 that may be transmitted, corresponding to a particular TID, by the originator 302 prior to expecting a BA frame from the recipient. In other words, the number of QoS data frames 330 that may be transmitted, corresponding to the particular TID, by the originator 302, prior to expecting a BA frame, may not exceed a maximum supported acknowledgment bitmap length from the set of supported acknowledgment bitmap lengths. If the number of transmitted QoS data frames 330 exceeds the maximum supported acknowledgment bitmap length, it is possible that not all the transmitted QoS data frames 330 are acknowledged in the BA frame 335.

Communication devices operating within the WLAN 110 may operate according to different versions of a communication protocol. In some embodiments, this may result in inconsistent selection of acknowledgment bitmap lengths across different communication devices operating within the WLAN 110, at least when one or more BA frame variants are being used, e.g., when a multi-STA BA is being used. As merely an example, the client station 154 and the AP 114 may negotiate an allocated number of buffers at the AP 114, and based on the allocated number of buffers, the AP 114 may select an acknowledgment bitmap length of 256 bits for both C-BA frames and multi-STA BA frames. However, the client station 154 may operate according to a version of the communication protocol that limits a length of the acknowledgement bitmap to 64 bits for multi-STA BA frames and does not support an acknowledgment bitmap that is 256 bits long for multi-STA BA frames (on the other hand, the version of the communication protocol may support an acknowledgment bitmap that is 256 bits long for C-BA frames), according to an embodiment. If the AP 114 transmits a multi-STA BA frame with the 256-bit acknowledgment bitmap to the client station 154, the client station 154 may not be able to process the multi-STA BA frame correctly and/or encounter an error during processing of the multi-STA BA frame.

As another example, the client station 154 and the AP 114 may negotiate an allocated number of buffers at the AP 114 to be equal to 250. However, the AP 114 may operate according to a version of the communication protocol that limits a length of the acknowledgement bitmap in multi-STA BA frames to 64 bits (on the other hand, the version of the communication protocol may support an acknowledgment bitmap that is 256 bits long for C-BA frames). However, the client station 154 may operate according to a version of the communication protocol that can accommodate a bitmap that is up to 256-bit long in both multi-STA BA frames and C-BA frames. Based on this, the client station 154 may transmit a number of QoS data frames 330 that exceeds a number of data frames (e.g., 250 frames corresponding to the allocated number of buffers at the AP 114) that may be acknowledged in the BA bitmap field 646 of a multi-STA BA frame. This may result in at least some of the QoS data frames 330 being unacknowledged.

To ensure compatibility across different communication devices with differing processing capabilities with respect a length of a BA bitmap, information regarding the supported bitmap lengths may be exchanged prior to the data transfer and acknowledgment portion 308. In an embodiment, the ADDBA request frame 310 and the ADDBA response frame 320 may include additional signaling information that is used to negotiate maximum supported acknowledgment bitmap lengths.

FIG. 7A is a diagram of an example format of an ADDBA extension element 700 in an embodiment. In an embodiment, the ADDBA extension element 700 corresponds to the ADDBA extension element 438 (FIG. 4B) and/or to the ADDBA extension element 458 (FIG. 4C). FIG. 7A indicates example lengths (e.g., in terms of octets) of fields of the ADDBA extension element 700. In other embodiments, length(s) one or more of the subfields has another suitable number length(s). In some embodiments, one or more of the subfields are omitted and/or one or more additional subfields are included in the ADDBA extension element 700.

The ADDBA extension element 700 includes an element identifier (ID) field 702, a length field 704, and an ADDBA capabilities field 706.

The element ID field 702 includes a value that identifies the field 700 as an ADDBA extension element. The length field 704 specifies a number of octets that follows the length field 704. The ADDBA capabilities field 706 includes other signaling information for negotiating the BA agreement and is described in more detail with reference to FIGS. 7B and 7C.

FIG. 7B is a diagram of an example format of an ADDBA capabilities field 720 in an embodiment. In an embodiment, the ADDBA capabilities field 720 corresponds to the ADDBA capabilities field 706 (FIG. 7A). FIG. 7B indicates example lengths (e.g., in terms of bits) of subfields of the ADDBA capabilities field 720. In other embodiments, length(s) one or more of the subfields has another suitable number length(s). In some embodiments, one or more of the subfields are omitted and/or one or more additional subfields are included in the ADDBA capabilities field 720.

The ADDBA capabilities field 720 includes a no fragmentation subfield 722, an HE fragmentation operation subfield 724, a 256-bit bitmap in multi-STA BA subfield 726, and a reserved subfield 728.

The no fragmentation subfield 722 includes a value that is used to indicate whether a fragmented MSDU may be transmitted (for e.g., in the QoS data frames 330) under the BA agreement. The HE fragmentation operation subfield 724 includes a value that indicates a level of dynamic fragmentation that is requested in ADDBA request or is allowed in ADDBA response for fragmented MSDUs under the BA agreement. The 256-bit bitmap in multi-STA BA subfield 726 indicates whether a 256-bit long acknowledgment bitmap (in a multi-STA BA frame) is requested in ADDBA request or is allowed in ADDBA response at a transmitter of the corresponding ADDBA request frame or the ADDBA response frame. In an embodiment, if the value in the Buffer Size 468 is more than 64, the BA bitmap length in a C-BA frame will be 256-bits long.

In an embodiment, if the 256-bit bitmap in multi-STA BA subfield 726 in an ADDBA request is not set to one, the 256-bit bitmap in multi-STA BA subfield 726 in a corresponding ADDBA response will not be set to one. In an embodiment, if the value in the Buffer Size field (not shown) in the ADDBA request/response frame is no more than 64, the 256-bit bitmap in multi-STA BA subfield 726 in ADDBA request/response cannot be set to one. In an embodiment, a client station or an AP announces whether the client station/AP supports the reception of 256-bit long acknowledgment bitmap in a multi-STA BA frame in an Extended Capabilities element. In an embodiment, when a peer device announces the peer device supports 256-bit long acknowledgment bitmap, the ADDBA request addressed to the peer STA can have a value one in the 256-bit bitmap in multi-STA BA subfield 726.

For instance, if the client station 154 transmits the ADDBA request frame 310 (FIG. 3) or the ADDBA response frame 320 (FIG. 3) with the corresponding 256-bit bitmap in multi-STA BA subfield 726 set to 1, the client station 154 requests or allows, respectively, (e.g., may encode/generate/receive/decode) a 256-bit long acknowledgment bitmap in the BA bitmap field 646 of the BA information field 640 of a multi-STA BA frame. Similarly, if the AP 114 transmits the ADDBA request frame 310 (FIG. 3) or the ADDBA response frame 320 (FIG. 3) with the corresponding 256-bit bitmap in multi-STA BA subfield 726 set to 1, the AP 114 requests or allows, respectively, (e.g., may encode/generate/receive/decode) a 256-bit long acknowledgment bitmap in the BA bitmap field 646 of the BA information field 640 of a multi-STA BA frame.

If both the originator 302 and the recipient 304 set the 256-bit bitmap in multi-STA BA subfield 726 (e.g., in the ADDBA request/response) to one, the originator 302 may transmit up to 256 QoS data frames 330 for the negotiated TID in the data transfer and acknowledgment portion 308 (e.g., in a multi-TID A-MPDU, a single-TID A-MPDU in a high efficiency (HE) trigger-based (TB) PPDU, or other kinds of A-MPDUs that solicit multi-STA BAs) prior to receiving the multi-STA BA frame 335. An HE TB PPDU is an uplink transmission that is triggered by a trigger frame received from another device, such as the AP 114. In an embodiment, the number of data frames 330 that the originator 302 may transmit may be limited by a number of buffers allocated at the recipient 304 (e.g., as indicated by the buffer size subfield 468).

In an embodiment wherein both the originator 302 and the recipient 304 set the 256-bit bitmap in multi-STA BA subfield 726 (e.g., in the ADDBA request/response) to one and negotiate a BA buffer size more than 64 (but no more than 256) for a TID, the originator 302 may transmit no more than 256 QoS Data frames for the TID in a multi-TID A-MPDU to the recipient 304. Accordingly, the recipient 304 may generate and transmit the multi-STA BA frame 335 with acknowledgment bitmaps up to a length of 256 bits in the BA bitmap field 646 of the BA information field 640. In an embodiment, the recipient 304 may also generate and transmit the multi-STA BA frame 335 with acknowledgment bitmaps of lengths 32 bits, 64 bits, and/or 128 bits in the BA bitmap field 646 of the BA information field 640. In an embodiment wherein both the originator 302 and the recipient 304 set the 256-bit bitmap in multi-STA BA subfield 726 (e.g., in the ADDBA request/response) to one and negotiate a BA buffer size more than 64 (but no more than 256) for a TID, the originator 302 may transmit no more than 256 QoS Data frames for the TID in a single-TID A-MPDU in an HE TB PPDU to the recipient AP 304. Accordingly, the recipient AP 304 may generate and transmit the multi-STA BA frame 335 with acknowledgment bitmaps up to a length of 256 bits in the BA bitmap field 646 of the BA information field 640. In an embodiment, the recipient AP 304 may also generate and transmit the multi-STA BA frame 335 with acknowledgment bitmaps of lengths 32 bits, 64 bits, and/or 128 bits in the BA bitmap field 646 of the BA information field 640.

If the originator 302 transmits an ADDBA request frame 310 (FIG. 3) with the corresponding 256-bit bitmap in multi-STA BA subfield 726 set to 0, the originator 302 does not request (e.g., may not receive/decode) a 256-bit long acknowledgment bitmap in the multi-STA BA bitmap field 646 of the BA information field 640 and may only support acknowledgment bitmaps that are smaller in length (e.g., 32 bits, 64 bits, and/or 128 bits long). Similarly, if the recipient 304 transmits an ADDBA response frame 320 (FIG. 3) with the corresponding 256-bit bitmap in multi-STA BA subfield 726 set to 0, the recipient 304 does not allow (e.g., may not encode/generate) a 256-bit long acknowledgment bitmap in the BA bitmap field 646 of the BA information field 640 in the multi-STA BA frame and may only support acknowledgment bitmaps that are smaller in length (e.g., 32 bits, 64 bits, and/or 128 bits long).

If one or both of the originator 302 and the recipient 304 do not set the 256-bit bitmap in multi-STA BA subfield 726 (e.g., in the ADDBA request/response) to one, the originator 302 may only transmit a maximum number of QoS data frames 330 from a TID in a multi-TID A-MPDU or single TID A-MPDU in HE TB PPDU, in the data transfer and acknowledgment portion 308, corresponding to a next lower maximum supported length of the acknowledgment bitmap at both the originator 302 and the recipient 304. Accordingly, the originator 302 adjusts its block acknowledgment transmission window within the data transfer and acknowledgment portion 308, in an embodiment. For instance, if one or both of the originator 302 and the recipient 304 do not set the 256-bit bitmap in multi-STA BA subfield 726 (e.g., in the ADDBA request/response) to one, the originator 302 may transmit up to 64 QoS data frames 330 prior to expecting the BA frame 335, in an embodiment. In an embodiment, the number of data frames 330 that the originator 302 may transmit may be limited by a number of buffers allocated at the recipient 304 (e.g., as indicated by the buffer size subfield 468).

In an embodiment wherein one or both the originator 302 and the recipient 304 do not support a 256-bit long acknowledgment bitmap in the BA bitmap field 646, the recipient 304 may generate and transmit the BA frame 335 (e.g., a multi-STA BA frame) with acknowledgment bitmaps up to a maximum length of 64 bits in the BA bitmap field 646 of the BA information field 640.

Subfield 728 is reserved from use, in an embodiment.

In another embodiment, a maximum length of an acknowledgment bitmap (e.g. the acknowledgment bitmap in the BA bitmap field 646) in a multi-STA BA is different from a maximum BA bitmap length in a C-BA may be signaled in the ADDBA request frame 310 and/or the ADDBA response frame 320 as a function of a maximum number of buffers defined by the communication protocol and the value in Buffer size subfield 468. FIG. 7C is a diagram of an example format of an ADDBA capabilities field 740, in an embodiment. In an embodiment, the ADDBA capabilities field 740 corresponds to the ADDBA capabilities field 706 (FIG. 7A). The ADDBA capabilities field 740 is similar to the ADDBA capabilities field 720, and like-numbered subfields are not discussed in detail for reasons of brevity.

Bitmap scaling factor in multi-STA BA subfield 742 includes a value that indicates a maximum supported length of the acknowledgment bitmap in multi-STA BAs as a number corresponding to a fraction of the maximum length of the acknowledgment bitmap for C-BAs which is defined by i) the communication protocol and ii) the value in the buffer size element 468. For instance, the value may indicate 1, ½, ¼, ⅛, etc. In an embodiment in which the maximum number of buffers announced in the Buffer Size subfield 468 is more than 64, the maximum number of the acknowledgment bitmap in C-BA is 256. If the communication protocol allows a bitmap length of 256 in multi-STA BAs, a value of 1 in the bitmap scaling factor in multi-STA BA subfield 742 indicates that the maximum length of the acknowledgment bitmap corresponds to (for example, is equal to) the maximum number of buffers that may be allocated (e.g., 256 bits). A value of 2 in the bitmap scaling factor in multi-STA BA subfield 742 indicates that the maximum length of the acknowledgment bitmap in multi-STA BAs corresponds to (for example, is equal to) one half of the maximum number of buffers (e.g., 256) that may be allocated (e.g., 256/2=128 bits). A value of 0 indicates that the maximum length of the acknowledgment bitmap in multi-STA BAs is 64. In an embodiment, when the BA bitmap length in C-BA is 64 (e.g., when the value in Buffer Size 468 is no more than 64), the BA bitmap length in multi-STA BA is also 64, e.g., the bitmap scaling factor in multi-STA BA subfield 742 has value 0. In an embodiment, a station or an AP announces whether it supports the reception of 256-bit long acknowledgment bitmap in a multi-STA BA frame in the Extended Capabilities element. In an embodiment, when a peer device announces its support of 256-bit long acknowledgment bitmap, the ADDBA request/response addressed to the peer STA can have non-zero value in Bitmap scaling factor in multi-STA BA subfield 742.

Based on the corresponding bitmap scaling factor in multi-STA BA subfields 742 in the ADDBA request frame 310 and the ADDBA response frame 320, the client station 154 and the AP 114 negotiate a maximum length of an acknowledgment bitmap to be used in the multi-STA BA. In an embodiment, the negotiated maximum length of the acknowledgment bitmap in the multi-STA BA is set to be a maximum acknowledgment bitmap length that is announced at both the originator 302 and the recipient 304. In an embodiment, the negotiated maximum length of the acknowledgment bitmap in multi-STA BA is set to be a maximum acknowledgment bitmap length that is allowed by the recipient 304. In an embodiment, the negotiated maximum length of the acknowledgment bitmap in multi-STA BA is set to be a maximum acknowledgment bitmap length that is requested by the originator 302.

The originator 302 transmits a number of QoS data frames 330 that is less than or equal to the negotiated maximum length of the acknowledgment bitmap prior to expecting a BA from the recipient 304, according to an embodiment. In an embodiment, the originator 302 adjusts its block acknowledgment transmission window to transmit a number of QoS data frames 330 that is less than or equal to the negotiated maximum length of the acknowledgment bitmap prior to expecting a BA from the recipient 304. The originator 302 may also adjust its BA transmission window within the data transfer and acknowledgment portion 308 based on the number of buffers allocated at the recipient 304 (e.g., as indicated by the buffer size subfield 468), in an embodiment.

In an embodiment, the recipient 304 generates and transmits the BA frame 335 with an acknowledgment bitmap of a length that is less than or equal to the negotiated maximum length of the acknowledgment bitmap.

In an embodiment, supported acknowledgment bitmap lengths (e.g., a supported length of the acknowledgment bitmap in the BA bitmap field 646) may be signaled prior to initiating the frame exchange 300 corresponding to the BA mechanism. For instance, the client station 154 and/or the AP 114 may announce their corresponding maximum supported acknowledgment bitmap lengths in a field of a data unit transmitted prior to initiating the frame exchange 300. The maximum supported bitmap length may be included in a field of an extended capabilities element or an HE capabilities element. As merely an example, a 256-bit bitmap support in multi-STA BA frames subfield may be included in one or more of the above elements. A value of 1 in the 256-bit bitmap support in multi-STA BA frames field would indicate that the client station 154 and/or the AP 114 support an acknowledgment bitmap in multi-STA BA frames up to 256 bits long. As another example, a BA bitmap length subfield may be included in one or more of the above elements. In an embodiment, if the client station 154 and the AP 114 negotiate the BA bitmap length of C-BA is 256 and one of them announces no support of 256 BA bitmap in multi-STA BA, the A-MPDU which solicits multi-STA BA can't have more than 64 QoS Data frames from the related TID (the number of frames also under the restriction of Buffer Size, e.g., if Buffer Size 468 is 50, the frames in an A-MPDU for the related TID can't be more than 50). In an embodiment, if the client station 154 and the AP 114 negotiate the BA bitmap length of C-BA is 256 and they announce the support of 256 BA bitmap in multi-STA BA, the A-MPDU which solicits multi-STA BA can have more than 64 QoS Data frames from the related TID (and the BA bitmap for the related TID can be 256). The BA bitmap length in multi-STA BAs subfield may indicate supported acknowledgement bitmap lengths (e.g., 32 bits, 64 bits, 128 bits, and/or 256 bits). In an embodiment where the supported acknowledgment bitmap lengths are signaled prior to initiating the frame exchange 300, the ADDBA request frame 310 and the ADDBA response frame 320 do not include the 256-bit bitmap in multi-STA BA subfield 726 and/or the bitmap scaling factor in multi-STA BA subfield 742.

In an embodiment, a communication device selects, for the BA session, an acknowledgment bitmap that is shorter in length than a negotiated maximum length of an acknowledgment bitmap. For instance, with respect to the frame exchange 300, if the negotiated maximum length of an acknowledgment bitmap in the BA frame 335 is 256 bits, and a number of the data frames 330 to be acknowledged is less than or equal to 64, the recipient 304 may determine that an acknowledgment bitmap of a length of 64 bits is sufficient to acknowledge reception of the data frames 330. In such embodiments, the recipient 304 may determine a data rate and/or MCS to be used to generate the BA frame based on the negotiated maximum length of the acknowledgment bitmap, i.e., 256 bits.

The recipient 304 determines a duration of time required for transmission of the BA frame 335, if the BA frame 335 was transmitted at a primary data rate/MCS and included an acknowledgment bitmap that has a length equal to the negotiated maximum length of the acknowledgment bitmap. In an embodiment, the primary data rate/MCS corresponds to a data rate/MCS used for transmission of the data frames 330. The recipient then calculates a data rate/MCS required for transmission of the BA frame 335 with an acknowledgment bitmap that has a length less than the negotiated maximum length of the acknowledgment bitmap that would result in the BA frame 335 having the same duration of time. In an embodiment, this enables the AP 114 to reduce its data rate/MCS, thereby improving signal robustness of the transmitted BA frame 335. In an embodiment, this also simplifies the design of the recipient 304. For instance, the recipient 304 may simply assume that the remaining duration of the TXOP is long enough for transmission of the BA frame 355, if the BA frame 335 was transmitted at a primary data rate/MCS and included an acknowledgment bitmap that has a length equal to the negotiated maximum length of the acknowledgment bitmap. In an embodiment, the above technique for determining a data rate/MCS required for transmission of a BA frame may be used for BA mechanisms different from those described above with respect to FIG. 3.

In an embodiment, a single physical AP, such as the AP 114, implements a plurality of virtual APs managing a plurality of basic service sets (BSSs), each BSS including a corresponding virtual AP and an associated set of one or more client stations, such as the client stations 154. In one such embodiment, the AP 114 defines corresponding broadcast RUs for each virtual AP. A broadcast RU corresponding to a virtual AP is allocated for transmission of BA frames (such as the BA frame 335) to the set of client stations 154 associated with the virtual AP. For instance, in an embodiment wherein the AP 114 implements two virtual APs, two corresponding broadcast RUs are used to transmit respective BA frames to client stations 154 associated with the corresponding virtual APs.

In an embodiment, the one or more QoS data frames 330 (FIG. 3) are transmitted by the client station 154 as part of an UL MU transmission including one or more other data frames from one or more of the other client stations 154. In another embodiment, the one or more one or more QoS data frames 330 are transmitted by the AP 114 as part of a downlink (MU) transmission including one or more other data frames to one or more of the other client stations 154. In some embodiments, however, one or more of frames transmitted as part the above MU transmissions are management frames. In at least some such embodiments, the management frames are not aggregated with any other data frames and do not include any acknowledgment policy indication (e.g., in a corresponding MAC header field) to solicit an acknowledgment frame corresponding to the management frame. In such scenarios, when the management frame is i) transmitted to a client station (e.g., the client station 154-1) as part of the DL MU transmission with other data frames to other client stations 154, and ii) is not aggregated with any data frame in an A-MPDU, the client station 154-1 is not configured to transmit an acknowledgment frame to acknowledge the reception of the management frame. In some embodiments, the management frame may therefore be configured to include additional information to solicit the acknowledgment frame from the client station 154 to acknowledge the reception of the management frame.

Figure 8:
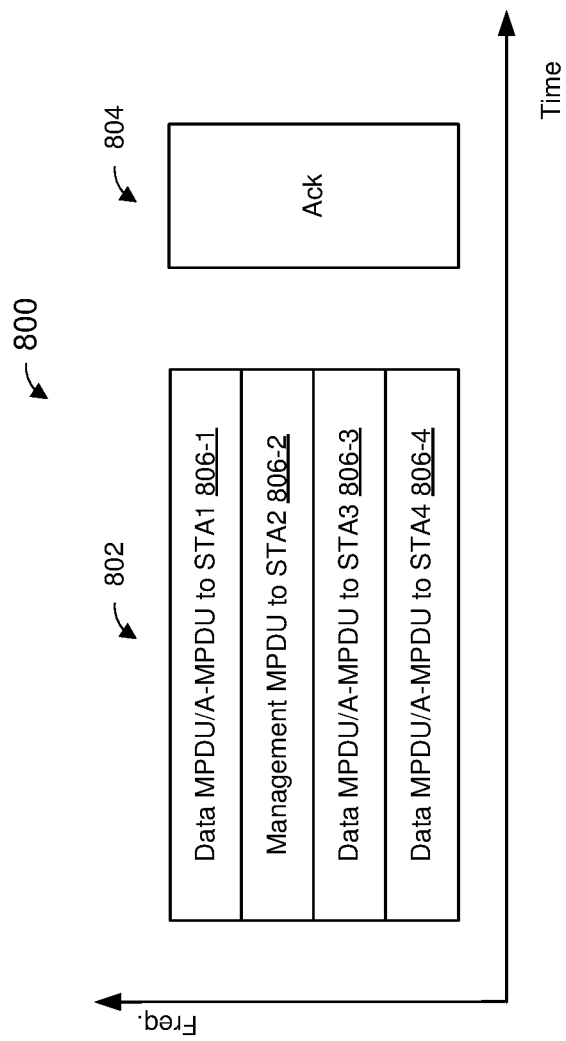
FIG. 8 is a timing diagram of an example frame exchange, according to an embodiment.

FIG. 8 is a timing diagram of an example MU frame exchange 800 between an AP (such as the AP 114) and multiple client stations (such as the client stations 154). The frame exchange 800 is described in the context of the example WLAN 110 merely for explanatory purposes. In some embodiments, signals illustrated in FIG. 8 are generated by other suitable communication devices in other suitable types of wireless networks.

The MU frame exchange 800 includes a downlink (DL) transmission 802 followed by an UL MU transmission 804, which includes acknowledgment frame from multiple client stations 154. The DL transmission 802 corresponds to a HE MU PPDU transmission from a first communication device (e.g., the AP 114) to a plurality of second communication devices (e.g., the client stations 154). In an embodiment, the HE MU PPDU transmission corresponds to an OFDMA transmission including respective frames 806 transmitted to respective second communication devices. In an embodiment, the UL MU transmission 804 corresponds to an UL OFDMA transmission and/or an UL MU-MIMO transmission.

In an embodiment, respective frames 806 include respective MPDUs/A-MPDUs that are transmitted to respective client stations 154 in respective RUs. In an embodiment, one or more of the frames (e.g., frame 806-1, frame 806-3, and frame 806-4) include data frames corresponding to the respective client stations 154 (e.g., STA1, STA3, and STA4). In an embodiment, at least one of the frames 806 (e.g., a frame 806-2) corresponding to a client station 154 (e.g., STA2) includes a management frame that is not aggregated with any other data frame.

To enable STA2 to acknowledge the reception of the management frame 806-2, the management frame 806-2 may be transmitted with a control field that includes information to trigger STA2 to transmit as part of the UL MU transmission 804. In an embodiment, the management frame includes an UL MU response scheduling control field (e.g., in the HT control field 414) that includes information to trigger STA2 to transmit as part of the UL MU transmission 804. In an embodiment, an uplink multi-user response scheduling (UMRS) control field includes an allocated RU and an MCS to be used by STA2 for transmission, as part of the UL MU transmission 804, of an acknowledgment frame to acknowledge the management frame 806-2.

In another embodiment, the management frame 806-2 is aggregated, in an A-MPDU, with a trigger frame that includes information to trigger STA2 to transmit as part of the UL MU transmission 804. In an embodiment, the trigger frame includes the allocated RU and the MCS to be used by STA2 to transmit as part of the UL MU transmission 804. In an embodiment, the management frame in DL MU PPDU always solicits an acknowledgement through an HE TB PPDU.

The client station 154 that receives the management frame 806-2 then transmits an acknowledgment frame, as part of the UL MU transmission 804, to acknowledge reception of the management frame 806-2. In an embodiment, if the client station 154 receives the management frame 806-2 without UMRS, but doesn't receive the Trigger frame, the client station 154 will not respond with an ACK in an SU PPDU.

Figure 9:
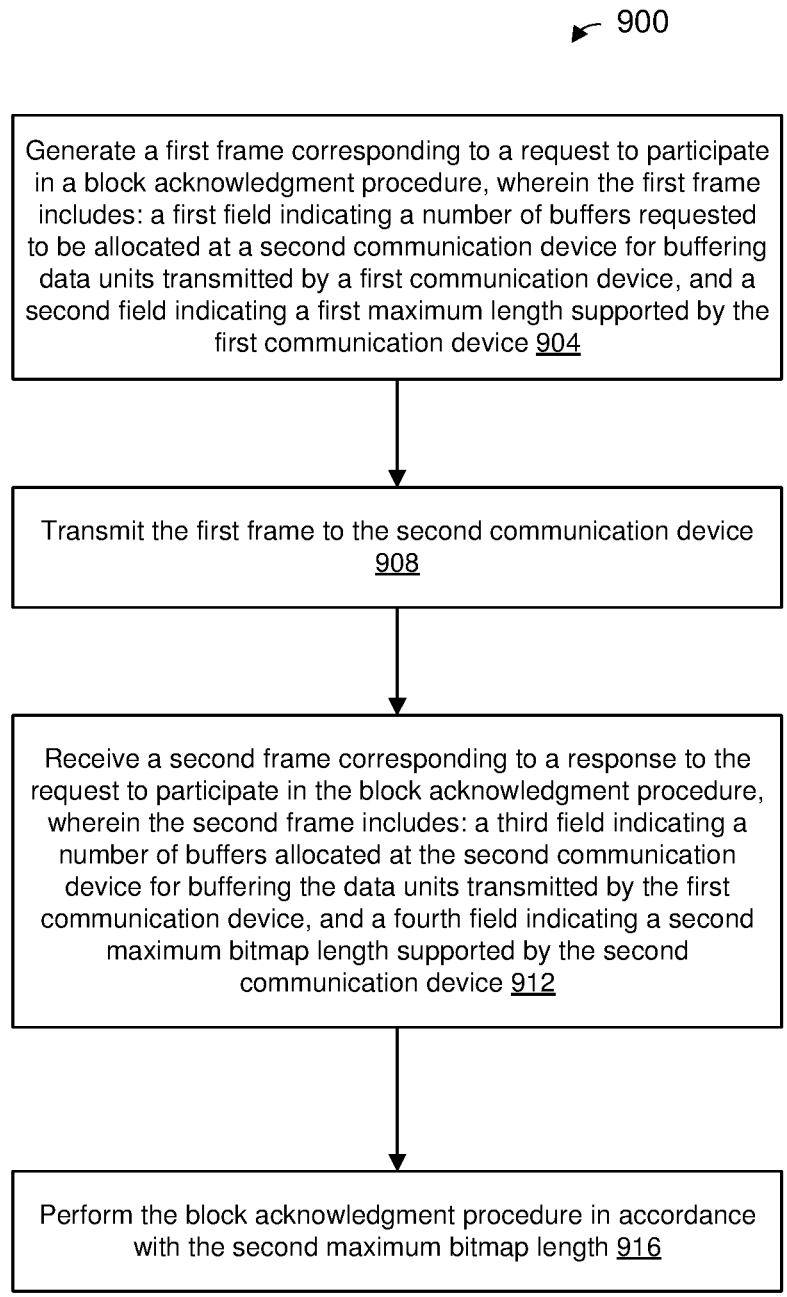
FIG. 9 is a flow diagram of an example method corresponding to a block acknowledgment procedure, according to an embodiment.

FIG. 9 is a flow diagram of an example method 900 for performing a block acknowledgment procedure, according to an embodiment. In some embodiments, the client station 154 (e.g., network interface device 162) of FIG. 1 is configured to implement the method 900. The method 900 is described in the context of the client station 154 merely for explanatory purposes and, in other embodiments, the method 900 is implemented by another suitable device. For instance, in an embodiment, the AP 114 (e.g., the network interface device 122) of FIG. 1 is configured to implement the method 900.

The method 900 is implemented in conjunction with the procedures, frame formats, etc., described above in connection with one or more of FIGS. 3, 4A-4C, 5, 6A-6C, 7A-7C, and FIG. 8, in various embodiments. In other embodiments, the method 900 is implemented in conjunction with suitable procedures, frame formats, etc., different than those discussed above.

At block 904, a first communication device generates (e.g., the originator 302 generates, the network interface device 162 generates, the MAC processor 166 generates, etc.) a first communication frame corresponding to a request to participate in a BA procedure. In an embodiment, the first communication frame is generated to include i) a first field that indicates a number of buffers requested to be allocated at a second communication device for buffering data units to be transmitted by the first communication device, and ii) a second field that indicates a first maximum bitmap length supported by the first communication device. In an embodiment, the first communication frame is an ADDBA request frame 420 as described above with respect to FIG. 4B. In an embodiment, the first communication frame further includes one or more of the fields described with respect to FIGS. 7A-7C.

At block 908, the first communication device transmits (e.g., the originator 302 transmits, the network interface device 162 transmits, the PHY processor 170 transmits, etc.) the first communication frame to the AP 114.

At block 912, the first communication device receives (e.g., the originator 302 receives, the network interface device 162 receives, the PHY processor 170 receives, etc.) a second communication frame corresponding to a response to the request to participate in the BA procedure transmitted at bock 908. In an embodiment, the second communication frame includes i) a third field indicating a number of buffers allocated at the second communication device for buffering the data units transmitted by the client station 154, and ii) a fourth field indicating a second maximum bitmap length supported by the second communication device. In an embodiment, the second communication frame is an ADDBA response frame 440 as described above with respect to FIG. 4C. In an embodiment, the second communication frame further includes one or more of the fields described with respect to FIGS. 7A-7C.

At block 916, the first communication device performs (e.g., the originator 302 performs, the network interface device 162 performs, the PHY processor 170 performs, the MAC processor 166 performs etc.) the BA procedure in accordance with the second bitmap length. For instance, in an embodiment, the originator 302 transmits a number of data frames to the recipient 304 based on the i) the number of buffers allocated at the recipient 304 and/or ii) the second maximum bitmap length.

Figure 10:
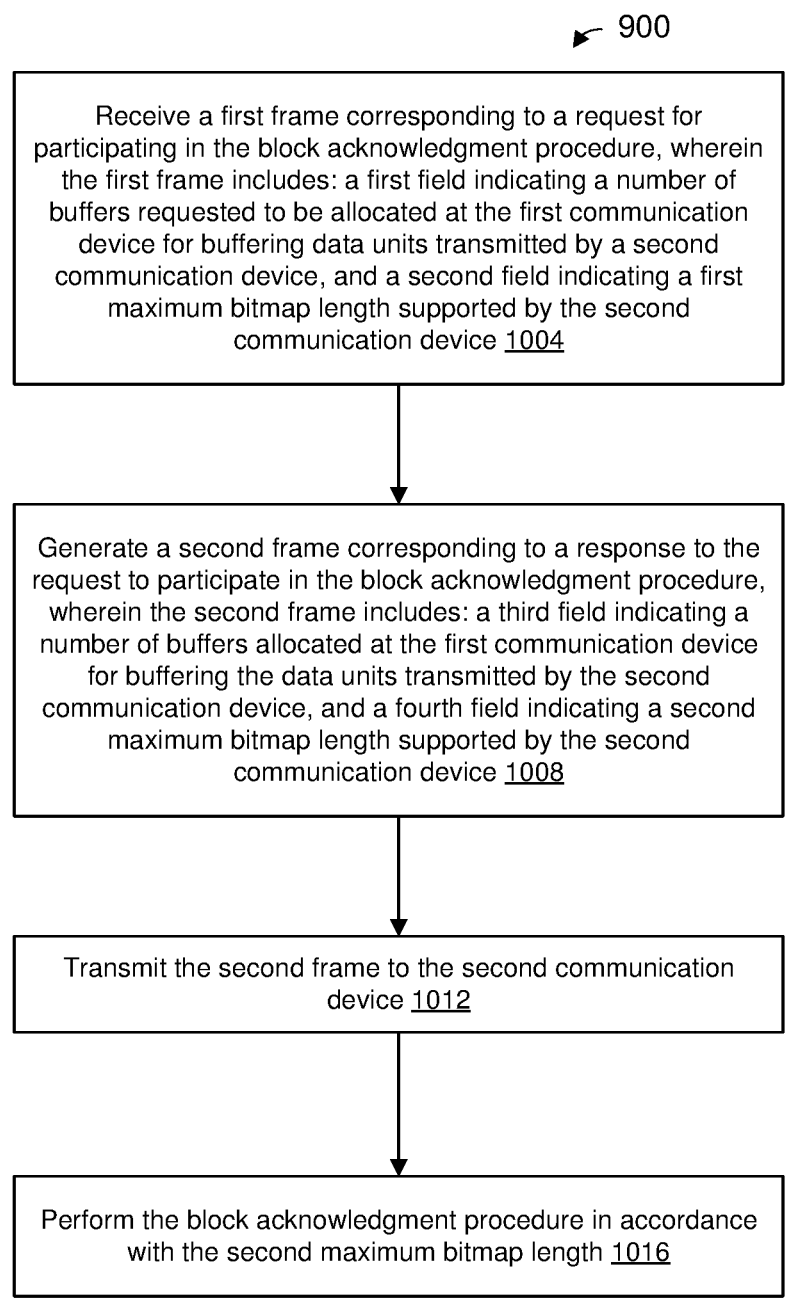
FIG. 10 is a flow diagram of an example method corresponding to a block acknowledgment procedure, according to another embodiment.

FIG. 10 is a flow diagram of an example method 1000 corresponding to a block acknowledgment mechanism, according to an embodiment. In some embodiments, the AP 114 (e.g., the network interface device 122) of FIG. 1 is configured to implement the method 1000. The method 1000 is described in the context of the client station 154 merely for explanatory purposes and, in other embodiments, the method 1000 is implemented by another suitable device. For instance, in an embodiment, the client station 154 (e.g., network interface device 162) of FIG. 1 is configured to implement the method 1000.

The method 1000 is implemented in conjunction with the procedures, frame formats, etc., described above in connection with one or more of FIGS. 3, 4A-4C, 5, 6A-6C, 7A-7C, and FIG. 8, in various embodiments. In other embodiments, the method 1000 is implemented in conjunction with suitable procedures, frame formats, etc., different than those discussed above.

At block 1004, a first communication device receives (e.g., the recipient 304 receives, the network interface device 122 receives, the MAC processor 126 receives, the PHY processor 130 receives, etc.) a first communication frame corresponding to a request to participate in a BA procedure. In an embodiment, the first communication frame includes i) a first field indicating a number of buffers requested to be allocated at the first communication device for buffering the data units transmitted by a second communication device, and ii) a fourth field indicating a second maximum bitmap length supported by the second communication device. In an embodiment, the first communication frame is an ADDBA request frame 420 as described above with respect to FIG. 4C. In an embodiment, the first communication frame further includes one or more of the fields described with respect to FIGS. 7A-7C.

At block 1008, the first communication device generates (e.g., the recipient 304 generates, the network interface device 122 generates, the MAC processor 126 generates, etc.) a second communication frame corresponding to a response to the request to participate in the BA procedure. In an embodiment, the second communication frame includes i) a third field indicating a number of buffers allocated at the first communication device for buffering the data units transmitted by the second communication device, and ii) a fourth field indicating a second maximum bitmap length supported by the first communication device. In an embodiment, the second communication frame is an ADDBA response frame 440 as described above with respect to FIG. 4C. In an embodiment, the second communication frame further includes one or more of the fields described with respect to FIGS. 7A-7C.

At block 1012, the first communication device transmits (e.g., the recipient 304 transmits, the network interface device 122 transmits, the PHY processor 130 transmits, etc.) the second communication frame to the second communication device.

At block 1016, the first communication device performs (e.g., the recipient 304 performs, the network interface device 122 performs, the MAC processor 126 performs, etc.) the BA procedure in accordance with the second maximum bitmap length. For instance, in an embodiment, the first communication device generates a BA frame with a bitmap of a length that is less than or equal to the second maximum bitmap length.

Figure 11:
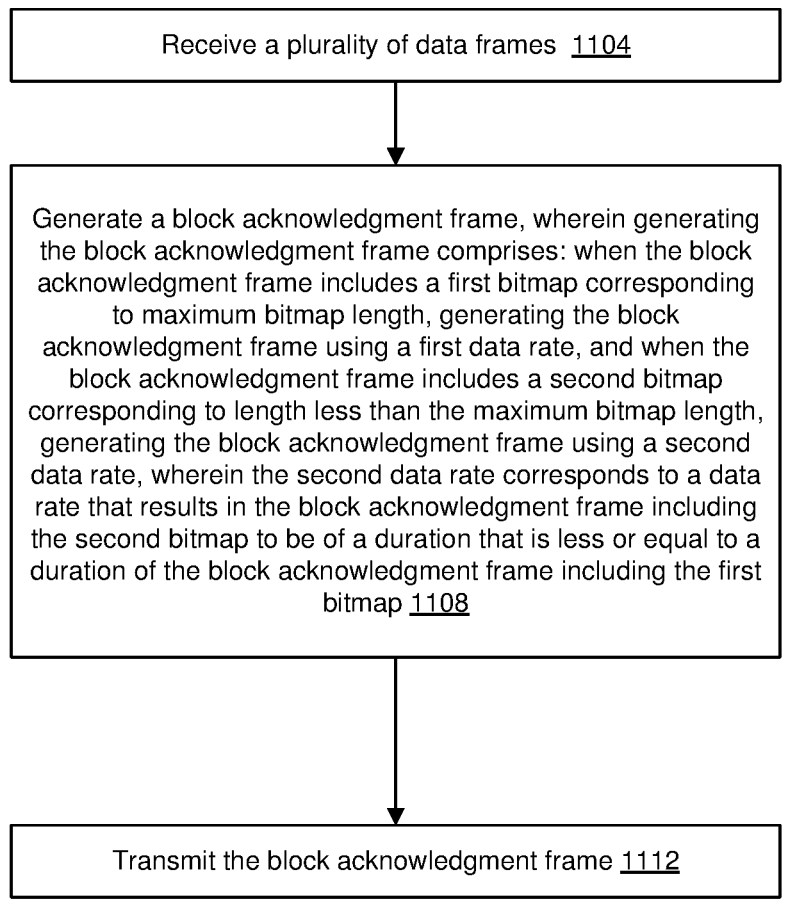
FIG. 11 is a flow diagram of an example method for transmitting a block acknowledgment, according to an embodiment.

FIG. 11 is a flow diagram of an example method 1100 corresponding to a block acknowledgment mechanism, according to an embodiment. In some embodiments, the AP 114 (e.g., the network interface device 122) of FIG. 1 is configured to implement the method 1100. The method 1100 is described in the context of the AP 114 merely for explanatory purposes and, in other embodiments, the method 1100 is implemented by another suitable device. For instance, in an embodiment, the client station 154 (e.g., network interface device 162) of FIG. 1 is configured to implement the method 1100.

The method 1100 is implemented in conjunction with the procedures, frame formats, etc., described above in connection with one or more of FIGS. 3, 4A-4C, 5, 6A-6C, 7A-7C, and FIG. 8, in various embodiments. In other embodiments, the method 1100 is implemented in conjunction with suitable procedures, frame formats, etc., different than those discussed above.

At block 1104, a first communication device receives (e.g., the recipient 304 receives, the network interface device 122 receives, the MAC processor 126 receives, the PHY processor 130 receives, etc.) a plurality of QoS data frames from a second communication device. For instance, in an embodiment, the plurality of QoS data frames are the plurality of QoS data frames 330 corresponding to the BA procedure as described with respect to FIG. 3.

At block 1104, the first communication device generates (e.g., the recipient 304 generates, the network interface device 122 generates, the MAC processor 126 generates, etc.) a BA frame. The BA frame corresponds to the BA frame 335 described with respect to FIG. 3, and FIGS. 6A-6C. The BA frame 335 is generated according to a data rate and/or an MCS that is selected based on a length of an acknowledgment bitmap included in the BA frame (e.g., the acknowledgment bitmap included in the BA bitmap field 624, BA bitmap field 646, etc.). For example, when the length of the acknowledgment bitmap is a maximum bitmap length (e.g., a maximum length of an acknowledgment bitmap as negotiated during a setup portion, such as the setup portion 306), the BA frame is generated using a first data rate/MCS. On the other hand, when the length of the acknowledgment bitmap is less than the maximum bitmap length, the BA frame is generated using a second data rate/MCS. In an embodiment, the second data rate/MCS is less than the first data rate/MCS. In an embodiment, the first communication device selects the second data rate/MCS such that a duration of the BA frame is approximately equal to (and less than or equal to) a duration of the BA frame if the BA frame included a bitmap having the maximum bitmap length and was generated according to the first data rate/MCS.

At block 1108, the first communication device transmits (e.g., the recipient 304 transmits, the network interface device 122 transmits, the PHY processor 130 transmits, etc.) the BA frame to the client station 154.

Embodiment 1: A method, comprising: generating, at a first communication device, a first communication frame corresponding to a request to participate in a block acknowledgment procedure, wherein the first communication frame includes: a first field indicating a number of buffers requested to be allocated at a second communication device for buffering data units to be transmitted by the first communication device, and a second field indicating a first maximum bitmap length supported by the first communication device. The method also comprises: transmitting, by the first communication device, the first communication frame to the second communication device; receiving, at the first communication device, a second communication frame corresponding to a response to the first communication frame, wherein the second communication frame includes: a third field indicating a number of buffers allocated at the second communication device for buffering the data units transmitted by the first communication device, and a fourth field indicating a second maximum bitmap length supported by the second communication device. The method further comprises: performing, at the first communication device, the block acknowledgment procedure in accordance with the second maximum bitmap length.

Embodiment 2: The method of Embodiment 1, wherein performing the block acknowledgment procedure in accordance with the second maximum bitmap length comprises: transmitting, by the first communication device, the data units to the second communication device; and receiving, at the first communication device, a block acknowledgment frame including a bitmap of a length that is less than or equal to the second maximum bitmap length, wherein the bitmap indicates whether the data units were successfully received at the second communication device.

Embodiment 3: The method of Embodiment 2, wherein: the data units are transmitted, by the first communication device, as part of a multi-user uplink transmission to the second communication device; and the block acknowledgment frame is a multi-station (multi-STA) block acknowledgement frame to the first communication device and one or more third communication devices in a multi-user downlink transmission.

Embodiment 4: The method of Embodiment 2, wherein: the data units are transmitted, by the first communication device, in a single-user transmission to the second communication device; and the block acknowledgment frame is a compressed block acknowledgement (C-BA) frame.

Embodiment 5: The method of any of Embodiments 1-4, wherein performing the block acknowledgment procedure in accordance with the second maximum bitmap length comprises: setting, at the first communication device, a block acknowledgment transmission window size based on the second maximum bitmap length.

Embodiment 6: The method of any of Embodiments 1-5, wherein: the second field indicates the first maximum bitmap length as a fraction of a maximum number of buffers defined by a communication protocol; and the fourth field indicates the second maximum bitmap length as a fraction of the maximum number of buffers defined by the communication protocol.

Embodiment 7: The method of any of Embodiment 1-6, wherein: performing the block acknowledgment procedure in accordance with the second maximum bitmap length is performed in response to determining that the number of buffers indicated by the third field is greater than a threshold; and the method further comprises: in response to determining that the number of buffers indicated by the third field is less than or equal to the threshold, performing, at the first communication device, the block acknowledgment procedure in accordance with a third maximum bitmap length that corresponds to the threshold.

Embodiment 8: The method of Embodiment 7, further comprising: in response to determining that the number of buffers indicated by the third field is less than or equal to the threshold, not processing, at the first communication device, the fourth field in the second communication frame.

Embodiment 9: An apparatus, comprising: a network interface device associated with a first communication device, wherein the network interface device includes one or more integrated circuit (IC) devices. The one or more IC devices are configured to: generate a first communication frame corresponding to a request to participate in a block acknowledgment procedure, wherein the first communication frame includes: a first field indicating a number of buffers requested to be allocated at a second communication device for buffering data units transmitted by the first communication device, and a second field indicating a first maximum bitmap length supported by the first communication device. The one or more IC devices are further configured to: transmit the first communication frame to the second communication device; and receive a second communication frame corresponding to a response to the first communication frame, wherein the second communication frame includes: a third field indicating a number of buffers allocated at the second communication device for buffering the data units transmitted by the first communication device, and a fourth field indicating a second maximum bitmap length supported by the second communication device. The one or more IC devices are further configured to: perform the block acknowledgment procedure in accordance with the second maximum bitmap length.

Embodiment 10: The apparatus of Embodiment 9, wherein the one or more IC devices are configured to perform the block acknowledgment procedure at least by: transmitting the data units to the second communication device; and receiving a block acknowledgment frame including a bitmap of a length that is less than or equal to the second maximum bitmap length, wherein the bitmap indicates whether the data units were successfully received at the second communication device.

Embodiment 11: The apparatus of Embodiment 10, wherein: the one or more IC devices are configured to transmit the data units are as part of a multi-user uplink transmission to the second communication device by the first communication device and one or more third communication devices; and the block acknowledgment frame is a multi-station (multi-STA) block acknowledgement frame to the first communication device and the one or more third communication devices in a multi-user downlink transmission.

Embodiment 12: The apparatus of Embodiment 10, wherein: the one or more IC devices are configured to transmit the data units in a single-user transmission to the second communication device; and the block acknowledgment frame is a compressed block acknowledgement (C-BA) frame.

Embodiment 13: The apparatus of any of Embodiments 9-12, wherein the one or more IC devices are configured to adjust a block acknowledgment transmission window size based on the second maximum bitmap length.

Embodiment 14: The apparatus of any of Embodiments 9-13, wherein: the second field indicates the first maximum bitmap length as a fraction of a maximum number of buffers defined by a communication protocol; and the fourth field indicates the second maximum bitmap length as a fraction of the maximum number of buffers defined by the communication protocol.

Embodiment 15: The apparatus of any of Embodiments 9-14, wherein the one or more IC devices are configured to: perform the block acknowledgment procedure in accordance with the second maximum bitmap length in response to determining that the number of buffers indicated by the third field is greater than a threshold; and in response to determining that the number of buffers indicated by the third field is less than or equal to the threshold, perform the block acknowledgment procedure in accordance with a third maximum bitmap length that corresponds to the threshold.

Embodiment 16: The apparatus of Embodiment 15, wherein the one or more IC devices are configured to: in response to determining that the number of buffers indicated by the third field is less than or equal to the threshold, not process the fourth field in the second communication frame.

Embodiment 17: A method, comprising: receiving, at a first communication device, a first communication frame corresponding to a request for participating in the block acknowledgment procedure, wherein the first communication frame includes: a first field indicating a number of buffers requested to be allocated at the first communication device for buffering data units transmitted by a second communication device, and a second field indicating a first maximum bitmap length supported by the second communication device. The method also comprises: generating, at the first communication device, a second communication frame corresponding to a response to the first communication frame, wherein the second communication frame includes: a third field indicating a number of buffers allocated at the first communication device for buffering the data units transmitted by the second communication device, and a fourth field indicating a second maximum bitmap length supported by the second communication device. The method further comprises: transmitting, by the first communication device, the second communication frame to the second communication device in response to receiving the first communication frame; and performing, at the first communication device, the block acknowledgment procedure in accordance with the second maximum bitmap length.

Embodiment 18: The method of Embodiment 17, wherein performing the block acknowledgment procedure in accordance with the second maximum bitmap length comprises: receiving, at the first communication device, the data units from the second communication device; generating, at the first communication device, a block acknowledgment frame including a bitmap, wherein the bitmap is of a length that is less than or equal to the second maximum bitmap length, and wherein the bitmap indicates whether the data units were successfully received at the first communication device; and transmitting, by the first communication device, the block acknowledgment frame to the second communication device.

Embodiment 19: The method of Embodiment 18, wherein: the received data units are part of a multi-user uplink transmission by the second communication device and one or more third communication devices; and the block acknowledgment frame is a multi-station (multi-STA) block acknowledgement frame to the second communication device and the one or more third communication devices in a multi-user downlink transmission.

Embodiment 20: The method of Embodiment 18, wherein: the received data units are included in a single-user transmission to the first communication device; and the block acknowledgment frame is a compressed block acknowledgement (C-BA) frame.

Embodiment 21: The method of any of Embodiments 17-20, wherein: the second field indicates the first maximum bitmap length as a fraction of a maximum number of buffers defined by a communication protocol; and the fourth field indicates the second maximum bitmap length as a fraction of the maximum number of buffers defined by the communication protocol.

Embodiment 22: An apparatus, comprising: a network interface device associated with a first communication device, wherein the network interface device includes one or more integrated circuit (IC) devices. The one or more IC devices are configured to: receive a first communication frame corresponding to a request for participating in a block acknowledgment procedure, wherein the first communication frame includes: a first field indicating a number of buffers requested to be allocated at the first communication device for buffering data units transmitted by a second communication device, and a second field indicating a first maximum bitmap length supported by the second communication device. The one or more IC devices are further configured to: generate a second communication frame corresponding to a response to the first communication frame, wherein the second communication frame includes: a third field indicating a number of buffers allocated at the first communication device for buffering the data units transmitted by the second communication device, and a fourth field indicating a second maximum bitmap length supported by the second communication device. The one or more IC devices are further configured to: transmit the second communication frame to the second communication device in response to the first communication frame; and perform the block acknowledgment procedure in accordance with the second maximum bitmap length.

Embodiment 23: The apparatus of Embodiment 22, wherein the one or more IC devices are configured to, as part of performing the block acknowledgment procedure in accordance with the second maximum bitmap length: receive the data units from the second communication device; generate a block acknowledgment frame including a bitmap, wherein the bitmap is of a length that is less than or equal to the second maximum bitmap length, and wherein the bitmap indicates whether the data units were successfully received at the first communication device; and transmit the block acknowledgment frame to the second communication device.

Embodiment 24: The apparatus of Embodiment 23, wherein: the received data units are part of a multi-user uplink transmission by the second communication device and one or more third communication devices; and the block acknowledgment frame is a multi-station (multi-STA) block acknowledgement frame to the second communication device and the one or more third communication devices in a multi-user downlink transmission.

Embodiment 25: The apparatus of Embodiment 23, wherein: the received data units are included in a single-user transmission to the first communication device; and the block acknowledgment frame is a compressed block acknowledgement (C-BA) frame.

Embodiment 26: The apparatus of any of Embodiments 22-25, wherein: the second field indicates the first maximum bitmap length as a fraction of a maximum number of buffers defined by a communication protocol; and the fourth field indicates the second maximum bitmap length as a fraction of the maximum number of buffers defined by the communication protocol.

Embodiment 27: A method, comprising: receiving, at a first communication device, a plurality of QoS data frames from a second communication device; generating, at the first communication device, a block acknowledgment frame having a bitmap, wherein the block acknowledgment frame is for acknowledging at least some of the plurality of QoS data frames. Generating the block acknowledgment frame comprises: in response to the bitmap having a first length corresponding to a maximum bitmap length, generating the block acknowledgment frame according to a first data rate, and in response to the bitmap having a second length that is less than the maximum bitmap length, generating the block acknowledgment frame using a second data rate that is lower than the first data rate. The method also comprises: transmitting, by the first communication device, the block acknowledgment frame to the second communication device.

Embodiment 28: The method of Embodiment 27, wherein: generating the block acknowledgment frame according to the first data rate includes generating the block acknowledgment frame according to a first modulation and coding scheme (MCS); and generating the block acknowledgment frame according to the second data rate includes generating the block acknowledgment frame according to a second MCS.

Embodiment 29: An apparatus, comprising: a network interface device associated with a first communication device, wherein the network interface device includes one or more integrated circuit (IC) devices. The one or more IC devices are configured to: receive a plurality of QoS data frames from a second communication device; generate a block acknowledgment frame having a bit map, wherein the block acknowledgment frame is for acknowledging at least some of the plurality of QoS data frames. Generating the block acknowledgment frame comprises: in response to the bitmap having a maximum bitmap length, generate the block acknowledgment frame according to a first data rate, and in response to the bitmap having a length that is less than the maximum bitmap length, generate the block acknowledgment frame according a second data rate that is less than the first data rate. The one or more IC devices are further configured to transmit the block acknowledgment frame to the second communication device.

Embodiment 30: The apparatus of Embodiment 29, wherein the one or more IC devices are configured to: in response to the bitmap having the maximum bitmap length, generate the block acknowledgment frame according to a first modulation and coding scheme (MCS); and in response to the bitmap having the length that is less than the maximum bitmap length, generating the block acknowledgment frame according to a second MCS.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
    transmitting, by a first communication device, first bitmap length capability information for the first communication device regarding block acknowledgment procedures;
    receiving, at the first communication device, second bitmap length capability information for a second communication device regarding block acknowledgment procedures;
    generating, at the first communication device, a first communication frame corresponding to a request to participate in a block acknowledgment procedure, wherein the first communication frame includes:
        a first field indicating a number of buffers requested to be allocated at the second communication device for buffering data units to be transmitted by the first communication device;
    transmitting, by the first communication device, the first communication frame to the second communication device;
    receiving, at the first communication device, a second communication frame corresponding to a response to the first communication frame, wherein the second communication frame includes:
        a second field indicating a number of buffers allocated at the second communication device for buffering the data units transmitted by the first communication device; and
    performing, at the first communication device, the block acknowledgment procedure, including setting a block acknowledgment transmission window size for the block acknowledgment procedure based on i) the second bitmap length capability information for the second communication device, ii) a value of the second field that indicates the number of buffers allocated at the second communication device, and iii) a determination of whether a block acknowledgement frame used in the block acknowledgment procedure is a compressed block acknowledgement (C-BA) frame or a multi-station (multi-STA) block acknowledgement frame.

2. The method of claim 1, wherein performing the block acknowledgment procedure comprises:
    transmitting, by the first communication device, the data units to the second communication device; and
    receiving, at the first communication device, a block acknowledgment frame including a bitmap having a bitmap length that-corresponds to the block acknowledgment transmission window size, wherein the bitmap indicates whether the data units were successfully received at the second communication device.

3. The method of claim 2, wherein:
    the data units are transmitted, by the first communication device, as part of a multi-user uplink transmission to the second communication device;
    the block acknowledgment frame is a multi-station (multi-STA) block acknowledgement frame to the first communication device and one or more third communication devices in a multi-user downlink transmission; and
    setting the block acknowledgment transmission window size for the block acknowledgment procedure is based on determining that the block acknowledgement frame is the multi-STA block acknowledgement frame.

4. The method of claim 2, wherein:
    the data units are transmitted, by the first communication device, in a single-user transmission to the second communication device;
    the block acknowledgment frame is a compressed block acknowledgement (C-BA) frame; and
    setting the block acknowledgment transmission window size for the block acknowledgment procedure is based on determining that the block acknowledgement frame is the C-BA frame.

5. The method of claim 1, wherein:
    performing the block acknowledgment procedure is performed in response to determining that the number of buffers indicated by the second field is greater than a threshold; and
    the method further comprises: in response to determining that the number of buffers indicated by the second field is less than or equal to the threshold, performing, at the first communication device, the block acknowledgment procedure in accordance with a bitmap length that corresponds to the threshold.

6. An apparatus, comprising:
    a wireless network interface device associated with a first communication device, wherein the wireless network interface device includes one or more integrated circuit (IC) devices, and wherein the one or more IC devices are configured to:
        control the wireless network interface device to transmit first bitmap length capability information for the first communication device regarding block acknowledgment procedures,
        receive second bitmap length capability information for a second communication device regarding block acknowledgment procedures,
        generate a first communication frame corresponding to a request to participate in a block acknowledgment procedure, wherein the first communication frame includes:
            a first field indicating a number of buffers requested to be allocated at the second communication device for buffering data units transmitted by the first communication device;
    wherein the one or more IC devices are further configured to:
        control the wireless network interface device to transmit the first communication frame to the second communication device, receive a second communication frame corresponding to a response to the first communication frame, wherein the second communication frame includes:
a second field indicating a number of buffers allocated at the second communication device for buffering the data units transmitted by the first communication device; and wherein the one or more IC devices are further configured to: perform the block acknowledgment procedure, including setting a block acknowledgment transmission window size for the block acknowledgment procedure based on i) the second bitmap length capability information for the second communication device, ii) a value of the second field, and iii) a determination of whether a block acknowledgement frame used in the block acknowledgment procedure is a compressed block acknowledgement (C-BA) frame or a multi-station (multi-STA) block acknowledgement frame.

7. The apparatus of claim 6, wherein the one or more IC devices are configured to perform the block acknowledgment procedure at least by:
controlling the wireless network interface device to transmit the data units to the second communication device; and
receiving a block acknowledgment frame including a bitmap having a bitmap length that corresponds to the block acknowledgment transmission window size, wherein the bitmap indicates whether the data units were successfully received at the second communication device.

8. The apparatus of claim 7, wherein:
the one or more IC devices are configured to control the wireless network interface device to transmit the data units are as part of a multi-user uplink transmission to the second communication device by the first communication device and one or more third communication devices;
the block acknowledgment frame is a multi-station (multi-STA) block acknowledgement frame to the first communication device and the one or more third communication devices in a multi-user downlink transmission; and
the one or more IC devices are configured to set the block acknowledgment transmission window size for the block acknowledgment procedure is based on determining that the block acknowledgement frame is the multi-STA block acknowledgement frame.

9. The apparatus of claim 7, wherein:
the one or more IC devices are configured to control the wireless network interface device to transmit the data units in a single-user transmission to the second communication device;
the block acknowledgment frame is a compressed block acknowledgement (C-BA) frame; and
the one or more IC devices are configured to set the block acknowledgment transmission window size for the block acknowledgment procedure is based on determining that the block acknowledgement frame is the C-BA frame.

10. The apparatus of claim 6, wherein the one or more IC devices are configured to:
perform the block acknowledgment procedure in response to determining that the number of buffers indicated by the second field is greater than a threshold; and
in response to determining that the number of buffers indicated by the second field is less than or equal to the threshold, perform the block acknowledgment procedure in accordance with a bitmap length that corresponds to the threshold.

11. The apparatus of claim 6, wherein the wireless network interface device further comprises one or more wireless transceivers configured to transmit the first communication frame and receive the second communication frame.

12. The apparatus of claim 11, further comprising:
one or more antennas coupled to the one or more wireless transceivers.

13. A method, comprising:
transmitting, by a first communication device, first bitmap length capability information for the first communication device regarding block acknowledgment procedures;
receiving, at the first communication device, second bitmap length capability information for a second communication device regarding block acknowledgment procedures;
receiving, at the first communication device, a first communication frame corresponding to a request for participating in the block acknowledgment procedure, wherein the first communication frame includes:
a first field indicating a number of buffers requested to be allocated at the first communication device for buffering data units transmitted by the second communication device;
generating, at the first communication device, a second communication frame corresponding to a response to the first communication frame, wherein the second communication frame includes:
a second field indicating a number of buffers allocated at the first communication device for buffering the data units transmitted by the second communication device;
transmitting, by the first communication device, the second communication frame to the second communication device in response to receiving the first communication frame; and
performing, at the first communication device, the block acknowledgment procedure, including selecting a bitmap length for a block acknowledgment frame based on i) the second bitmap length capability information for the second communication device, ii) a value of the second field that indicates the number of buffers allocated at the first communication device, and iii) a determination of whether the block acknowledgement frame is a compressed block acknowledgement (C-BA) frame or a multi-station (multi-STA) block acknowledgement frame.

14. The method of claim 13, wherein performing the block acknowledgment procedure comprises:
receiving, at the first communication device, the data units from the second communication device;
generating, at the first communication device, the block acknowledgment frame to include a bitmap having the selected bitmap length, wherein the bitmap indicates whether the data units were successfully received at the first communication device; and
transmitting, by the first communication device, the block acknowledgment frame to the second communication device.

15. The method of claim 14, wherein:
the received data units are part of a multi-user uplink transmission by the second communication device and one or more third communication devices;

the block acknowledgment frame is a multi-station (multi-STA) block acknowledgement frame to the second communication device and the one or more third communication devices in a multi-user downlink transmission; and selecting the bitmap length for the block acknowledgment frame is based on determining that the block acknowledgement frame is the multi-STA block acknowledgement frame.

16. The method of claim 14, wherein:

the received data units are included in a single-user transmission to the first communication device;

the block acknowledgment frame is a compressed block acknowledgement (C-BA) frame; and selecting the bitmap length for the block acknowledgment frame is based on determining that the block acknowledgement frame is the C-BA frame.

17. An apparatus, comprising:

a wireless network interface device associated with a first communication device, wherein the wireless network interface device includes one or more integrated circuit (IC) devices, and wherein the one or more IC devices are configured to:
- control the wireless network interface device to transmit first bitmap length capability information for the first communication device regarding block acknowledgment procedures,
- receive second bitmap length capability information for a second communication device regarding block acknowledgment procedures,
- receive a first communication frame corresponding to a request for participating in a block acknowledgment procedure, wherein the first communication frame includes:
  - a first field indicating a number of buffers requested to be allocated at the first communication device for buffering data units transmitted by the second communication device;

wherein the one or more IC devices are further configured to:
- generate a second communication frame corresponding to a response to the first communication frame, wherein the second communication frame includes:
  - a second field indicating a number of buffers allocated at the first communication device for buffering the data units transmitted by the second communication device; and wherein the one or more IC devices are further configured to:
- control the wireless network interface device to transmit the second communication frame to the second communication device in response to the first communication frame, and
- perform the block acknowledgment procedure, including selecting a bitmap length for a block acknowledgment frame based on i) the second bitmap length capability information for the second communication device, ii) a value of the second field, and iii) a determination of whether the block acknowledgement frame is a compressed block acknowledgement (C-BA) frame or a multi-station (multi-STA) block acknowledgement frame.

18. The apparatus of claim 17, wherein the one or more IC devices are configured to, as part of performing the block acknowledgment procedure:

receive the data units from the second communication device;

generate the block acknowledgment frame to include a bitmap having the selected bitmap length, wherein the bitmap indicates whether the data units were successfully received at the first communication device; and control the wireless network device to transmit the block acknowledgment frame to the second communication device.

19. The apparatus of claim 18, wherein:

the received data units are part of a multi-user uplink transmission by the second communication device and one or more third communication devices;

the block acknowledgment frame is a multi-station (multi-STA) block acknowledgement frame to the second communication device and the one or more third communication devices in a multi-user downlink transmission; and the one or more IC devices are configured to select the bitmap length for the block acknowledgment frame based on determining that the block acknowledgement frame is the multi-STA block acknowledgement frame.

20. The apparatus of claim 18, wherein:

the received data units are included in a single-user transmission to the first communication device;

the block acknowledgment frame is a compressed block acknowledgement (C-BA) frame; and the one or more IC devices are configured to select the bitmap length for the block acknowledgment frame based on determining that the block acknowledgement frame is the C-BA frame.

21. The apparatus of claim 17, wherein the wireless network interface device further comprises one or more wireless transceivers configured to transmit the first communication frame and receive the second communication frame.

22. The apparatus of claim 21, further comprising:

one or more antennas coupled to the one or more wireless transceivers.

* * * * *